(12) United States Patent
Murata

(10) Patent No.: US 10,007,114 B2
(45) Date of Patent: Jun. 26, 2018

(54) ELECTRO-OPTICAL DEVICE, ELECTRONIC APPARATUS, AND MANUFACTURING METHOD OF ELECTRO-OPTICAL DEVICE

(71) Applicant: SEIKO EPSON CORPORATION, Tokyo (JP)

(72) Inventor: Satoshi Murata, Sakata (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 15/142,058

(22) Filed: Apr. 29, 2016

(65) Prior Publication Data

US 2016/0322440 A1 Nov. 3, 2016

(30) Foreign Application Priority Data

May 1, 2015 (JP) .................................. 2015-093914
Feb. 2, 2016 (JP) .................................. 2016-017713

(51) Int. Cl.
*G02B 27/01* (2006.01)
*G09G 1/00* (2006.01)
*G09G 3/3233* (2016.01)

(52) U.S. Cl.
CPC ............. *G02B 27/017* (2013.01); *G09G 1/00* (2013.01); *G09G 3/3233* (2013.01); *G09G 2300/0842* (2013.01); *G09G 2310/0251* (2013.01); *G09G 2310/0262* (2013.01)

(58) Field of Classification Search
CPC ..... H01L 27/326; H01L 21/76; H01L 21/762; H01L 21/28123; H01L 21/76224; H01L 27/3258
See application file for complete search history.

(56) References Cited

U.S. PATENT DOCUMENTS 7,629,223 B2   12/2009 Narita et al.
9,184,347 B2   11/2015 Koshihara et al.
2016/0013258 A1   1/2016 Koshihara et al.

FOREIGN PATENT DOCUMENTS

| JP | S62-281345 A | 12/1987 |
| JP | 2000-232153 A | 8/2000 |
| JP | 2002-050680 A | 2/2002 |
| JP | 2005-203617 A | 7/2005 |
| JP | 2009-130242 A | 6/2009 |
| JP | 2013-238725 A | 11/2013 |

*Primary Examiner* — Daniel Whalen
*Assistant Examiner* — Suberr Chi
(74) *Attorney, Agent, or Firm* — Oliff PLC

(57) ABSTRACT

A display region E that includes an element isolation region 88 having a display region trench density D1, and in which a pixel circuit 110 including a transistor is arranged; a drive circuit region 105 that includes a region in which a drive circuit element isolation portion having a drive circuit region trench density D2 is provided, and in which drive circuits 101 and 102 that supply signals for driving the pixel circuit 110 are arranged; and a peripheral region 106 that includes region in which a peripheral element isolation portion having a peripheral region trench density D3 is provided, and is arranged at least between the display region E and the drive circuit region 105. The display region trench density D1 is different from the drive circuit region trench density D2, and the display region trench density D1 is equal to the peripheral region trench density D3.

6 Claims, 13 Drawing Sheets

ELECTRO-OPTICAL DEVICE, ELECTRONIC APPARATUS, AND MANUFACTURING METHOD OF ELECTRO-OPTICAL DEVICE

BACKGROUND

1. Technical Field

The present invention relates to an electro-optical device, an electronic apparatus in which the electro-optical device is installed, and a manufacturing method of the electro-optical device.

2. Related Art

An organic electroluminescent (hereinafter referred to as an organic EL) device including a silicon substrate on which pixel circuits, drive circuits that drive the pixel circuits, and the like are formed has been proposed (JP-A-2013-238725) as an example of electro-optical devices.

In the organic EL device described in JP-A-2013-238725, a plurality of the pixel circuits, the drive circuits (data line drive circuit, scan line drive circuit) that drive the pixel circuits, and the like are formed on the silicon substrate. The region where the pixel circuits are arranged is a display region, and the region where the drive circuits are arranged is a drive circuit region. The drive circuits are formed in an area surrounding the display region, and a plurality of drive transistors are provided. The pixel circuits are each provided with two or more pixel transistors, an organic EL element, and the like, and the organic EL element emits light by a current supplied via the pixel transistors. The organic EL device described in JP-A-2013-238725 is a micro display suitable for a display portion of a head mounted display, for example, and transistors are arranged more sparsely in the display region than in the drive circuit region.

The silicon substrate includes an STI (Shallow Trench Isolation) structure for isolating element regions, for example, and transistors (drive transistor, pixel transistor) are formed in the element regions.

The STI structure can be manufactured by a manufacturing method described in JP-A-2009-130242, for example. Specifically, an insulating layer constituted by silicon oxide and silicon nitride is deposited on a silicon substrate, and trenches are formed so as to surround the respective element regions in the silicon substrate. Subsequently, silicon oxide is deposited on the silicon substrate, and the trenches are filled with silicon oxide. Then, the silicon oxide is subjected to planarization processing by chemical mechanical polishing (hereinafter referred to as CMP). Then, the insulating layer that covers a surface of the silicon substrate is removed by etching, and the silicon substrate including the STI structure is formed.

However, in the planarization processing by CMP, the polishing speed of silicon oxide decreases in a portion in which an occupied area of a polishing target per unit area (hereinafter referred to as silicon oxide area) is large compared with a portion in which the silicon oxide area per unit area is small. In the organic EL device described in JP-A-2013-238725, transistors are arranged more sparsely in the display region than in the drive circuit region, and therefore the occupied area of the silicon oxide per unit area is smaller in the display region than in the drive circuit region. Accordingly, the silicon oxide is polished fast in the display region, and the silicon oxide is polished slowly in the drive circuit region. Furthermore, the silicon oxide is polished slower in the display region on a side closer to the drive circuit region than in the display region on a side farther from the drive circuit region due to more influence from the drive circuit region, and therefore there is concern that the flatness of the polished surface may degrade.

In addition, the flatness of the polished surface in the display region affects the characteristics of the pixel transistors, and a small difference occurs in the characteristics of the pixel transistors between those in the display region on the side closer to the drive circuit region and those in the display region on the side farther from the drive circuit region. Therefore, a small difference occurs in the luminance of light that is emitted from the organic EL elements between the portion of the display region on the side closer to the drive circuit region and the portion of the display region on the side farther from the drive circuit region. On the other hand, the human eye is sensitive to a change in luminance of light, and is likely to detect a small change in luminance of light that is emitted from the organic EL elements and recognize the change as luminance unevenness.

Therefore, the flatness of the polished surface of the silicon substrate may degrade, and there is a concern that the uniformity of the characteristics of the pixel transistors may degrade. There is a problem in that, if the uniformity of the characteristics of the pixel transistors degrades, the uniformity of luminance of light that is emitted from the organic EL elements degrades, and luminance unevenness (display unevenness) is likely to occur.

SUMMARY

The invention has been made in order to solve at least some of the foregoing problems, and can be achieved as the following modes or application examples.

APPLICATION EXAMPLE 1

An electro-optical device according to the present application example includes: a first region that includes a first trench element isolation region having a first density, and in which a pixel circuit including a transistor is arranged; a second region that includes a second trench element isolation region having a second density, and in which a drive circuit that supplies a signal for driving the pixel circuit is arranged; and a third region that includes a third trench element isolation region having a third density, and is arranged at least between the first region and the second region. The first density is different from the second density, and the first density is equal to the third density.

The third trench element isolation region having the same density as that of the first region is arranged in the third region between the first region and the second region. Therefore, the influence of the second region on the first region is lower compared with the case where the third region is not arranged between the first region and the second region, the state (flatness, for example) of the first region is unlikely to change between a portion of the first region on a side closer to the second region and a portion of the first region on a side farther from the second region.

Since the state (flatness, for example) of the first region is unlikely to change, the characteristic of a transistor (pixel circuit) formed in the first region is unlikely to change, and the uniformity of the characteristics of transistors (pixel circuit) formed in the first region can be improved. Therefore, the display uniformity of the electro-optical device can be improved, and higher quality display can be provided.

APPLICATION EXAMPLE 2

In the electro-optical device according to the aforementioned application example, the third region preferably surrounds the first region.

By arranging the third region so as to surround the first region, the influence of the second region on the first region can be decreased.

APPLICATION EXAMPLE 3

In the electro-optical device according to the aforementioned application example, the third region preferably surrounds the second region.

By arranging the third region so as to surround the second region, the influence of the second region on the first region can be decreased.

APPLICATION EXAMPLE 4

In the electro-optical device according to the aforementioned application example, the first trench element isolation region and the third trench element isolation region preferably have a same pattern.

Even in a case where the first trench element isolation region and the second trench element isolation region have different patterns, and the first density is different from the second density, by providing the third trench element isolation region having the same pattern as that of the first trench element isolation region and the same density as the first density in the third region between the first region and the second region, the influence of the second region on the first region can be decreased.

APPLICATION EXAMPLE 5

An electronic apparatus according to the present application example includes one of the electro-optical devices described in the aforementioned application examples.

By applying one of the electro-optical devices described in the aforementioned application examples to a display portion of the electronic apparatus according to the present application example, high quality display can be provided.

APPLICATION EXAMPLE 6

A manufacturing method of an electro-optical device is a manufacturing method of an electro-optical device including: a first region that includes a first trench element isolation region having a first density, and in which a pixel circuit including a transistor is arranged; a second region that includes a second trench element isolation region having a second density, and in which a drive circuit that supplies a signal for driving the pixel circuit is arranged; and a third region that includes a third trench element isolation region having a third density, and is arranged at least between the first region and the second region. The manufacturing method includes: forming a polishing stopper layer having a predetermined pattern on a silicon substrate; forming a trench in the silicon substrate using at least the polishing stopper layer as a mask; forming an insulating layer on the silicon substrate so as to fill the trench; and polishing the insulating layer using the polishing stopper layer as a stopper. In the forming the trench, the first trench having the first density is formed in the first region, the second trench having the second density is formed in the second region, and the third trench having the third density is formed in the third region such that the first density is different from the second density, and the first density is equal to the third density.

After forming trenches in the first region, the second region, and the third region in the silicon substrate, the insulating layer is formed (deposited), and the insulating layer is polished, and as a result the silicon substrate having a STI structure in which the trenches are filled with the insulating layer is formed.

When the third region having the third trench having the same density as the first trench is not formed between the first region and the second region, the polishing speed in the first region in polishing is likely to be influenced by the second region, and is likely to change. When the third region having the third trench having the same density as the first trench is formed between the first region and the second region, the polishing speed in the first region in the polishing is unlikely to be influenced by the second region, and is unlikely to change.

Accordingly, the state (flatness, for example) of a polishing surface in the first region is unlikely to change, and the uniformity of the characteristics of the transistor (pixel circuit) formed in the first region can be improved. Therefore, the display uniformity of the electro-optical device can be improved, and higher quality display can be provided.

APPLICATION EXAMPLE 7

In the manufacturing method of an electro-optical device according to the aforementioned application example, in the forming the trench, the third region is formed so as to surround the first region.

When the third region is formed so as to surround the first region in the forming the trench, the influence of the second region to the first region in the polishing can be reduced.

APPLICATION EXAMPLE 8

In the manufacturing method of an electro-optical device according to the aforementioned application example, in the forming the trench, the third region is formed so as to surround the second region.

When the third region is formed so as to surround the second region in the forming of the trench, the influence of the second region to the first region in the polishing can be reduced.

APPLICATION EXAMPLE 9

In the manufacturing method of an electro-optical device according to the aforementioned application example, in the forming the trench, the first trench and the third trench preferably have a same pattern.

Even in a case where the first trench and the second trench have different patterns, and the first density and the second density are different, the influence of the second region to the first region can be decreased by providing the third trench having the same pattern as that of the first trench and the same density as the first density in the third region between the first region and the second region.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
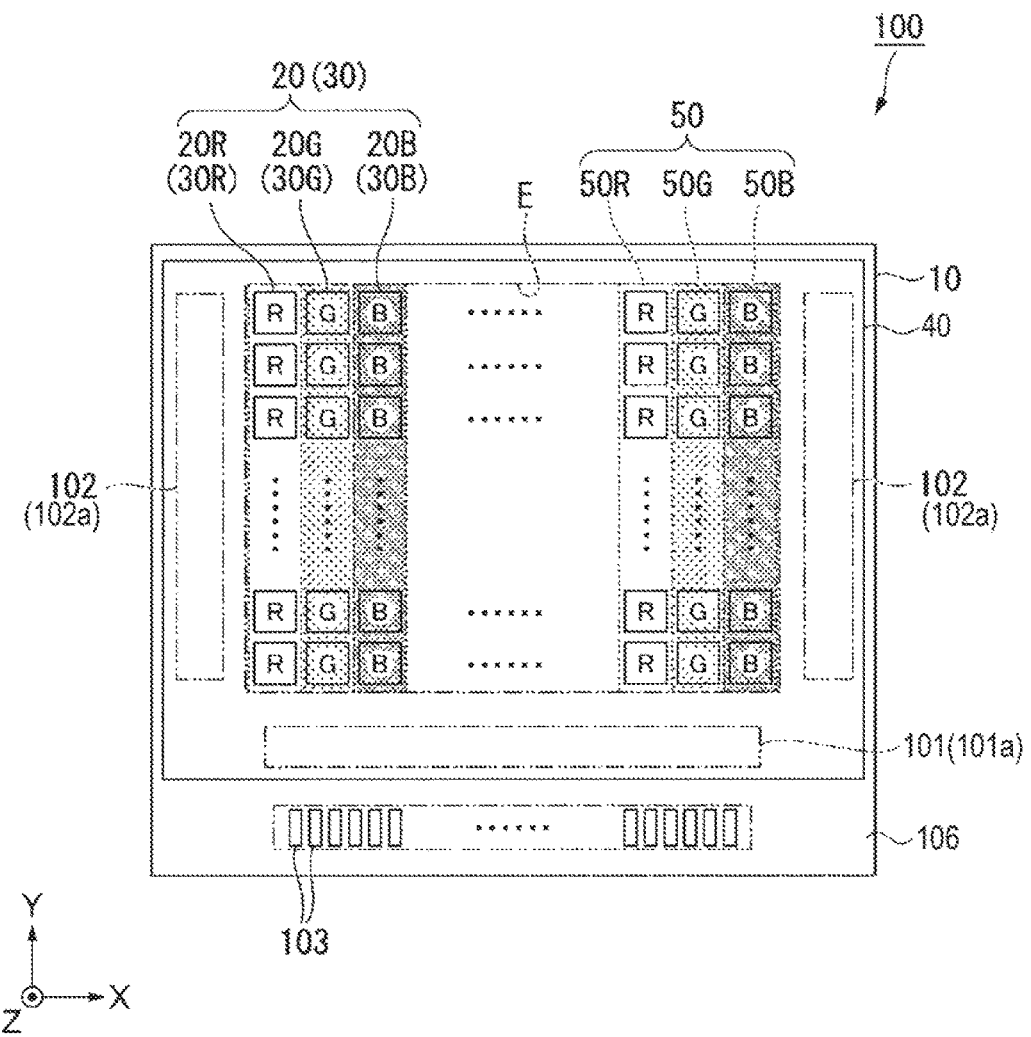
FIG. 1 is a schematic planar view illustrating a general configuration of an organic EL device according to Embodiment 1.

Hereinafter, embodiments of the invention will be described with reference to the drawings. These embodiments are merely examples of the invention, and do not limit the invention. Various modifications can be freely made within the technical idea of the invention. Note that, in the drawings below, layers and constituent components are shown at a scale different from their actual scales, so that each of the layers and the constituent components is large enough to be recognized in the drawings.

Embodiment 1

General Configuration of Organic EL Device

Figure 2:
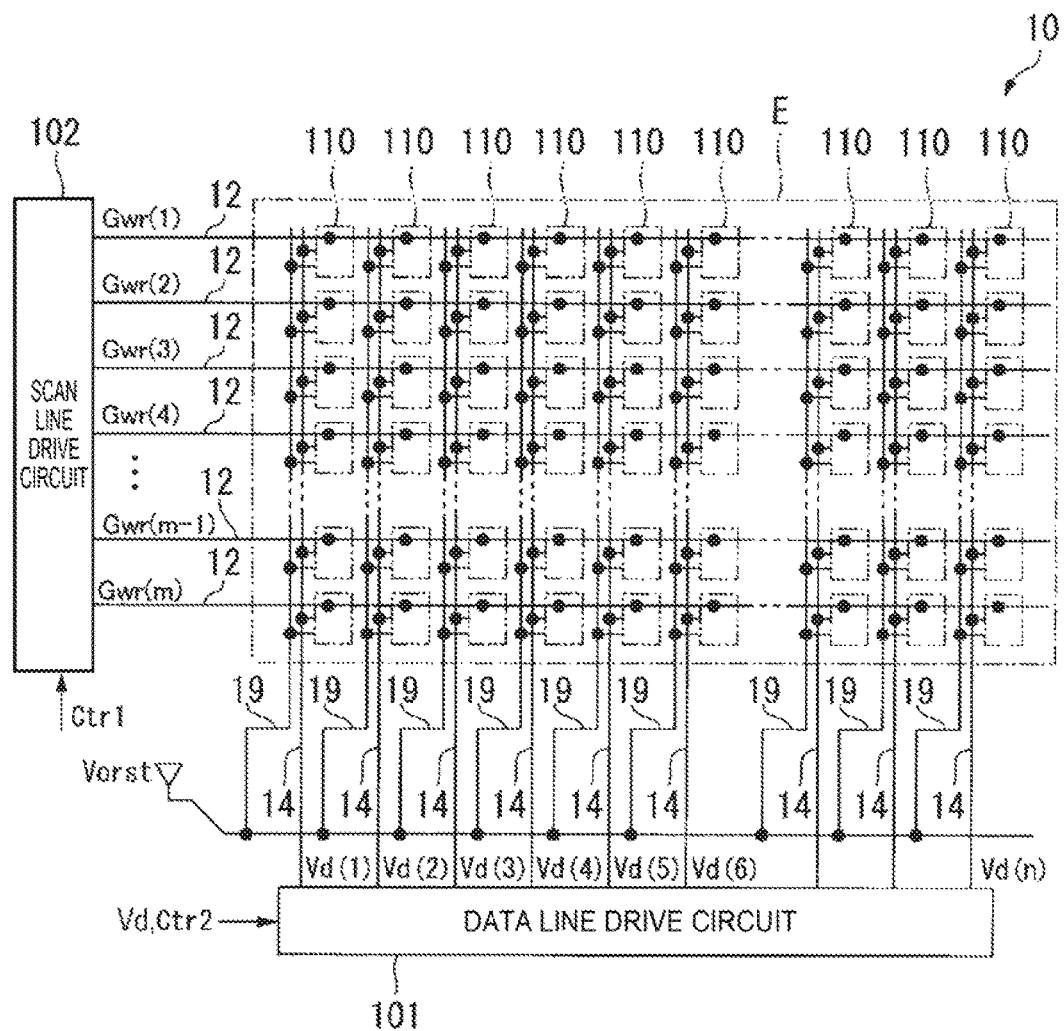
FIG. 2 is a diagram illustrating an electrical configuration of the organic EL device according to Embodiment 1.
Figure 3:
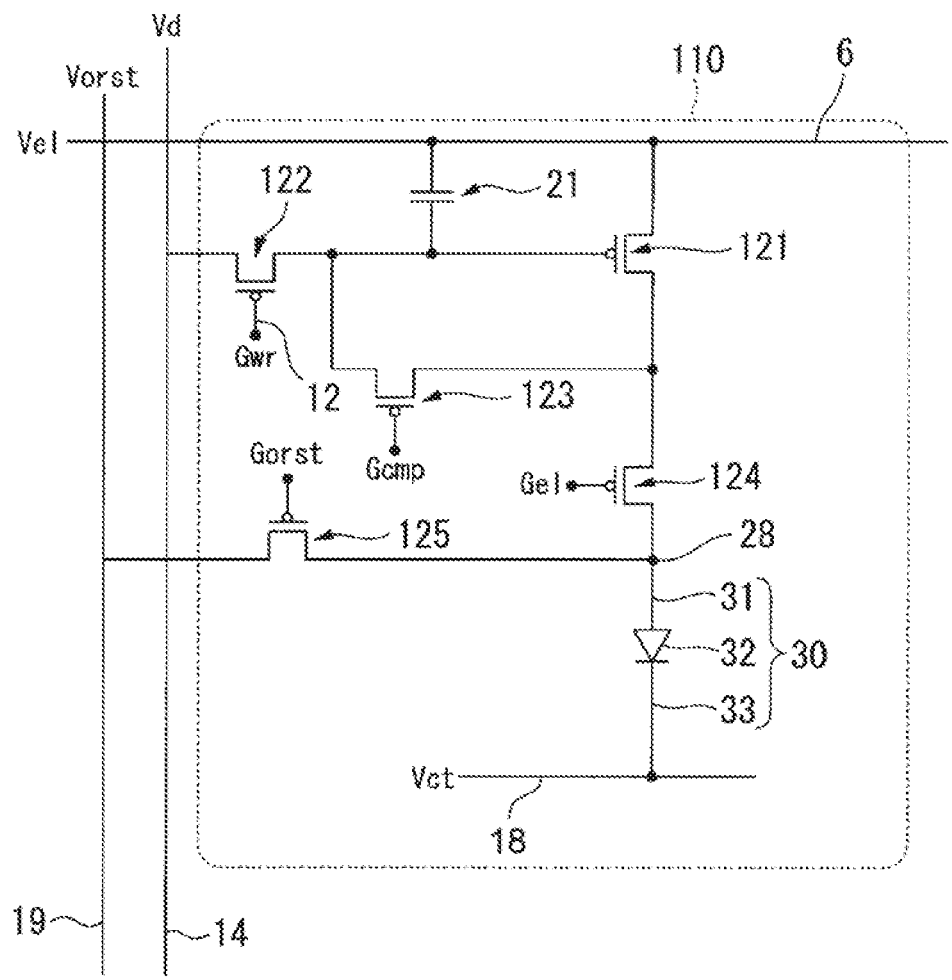
FIG. 3 is a diagram illustrating an electrical configuration of a pixel circuit.

FIG. 1 is a schematic planar view illustrating a general configuration of an organic EL device according to Embodiment 1. FIG. 2 is a diagram illustrating an electrical configuration of the organic EL device according to Embodiment 1. FIG. 3 is a diagram illustrating an electrical configuration of a pixel circuit.

First, the general configuration of an organic EL device 100 according to Embodiment 1 will be described with reference to FIGS. 1 to 3.

The organic EL device 100 includes an element substrate 10 and a protection substrate 40, as shown in FIG. 1. The element substrate 10 and the protection substrate 40 are joined by an adhesive (later-described resin layer 41, refer to FIG. 5), which is not illustrated, in a state of opposing each other. Note that an epoxy resin, an acrylic resin, or the like can be used as the adhesive (resin layer 41), for example.

Note that the organic EL device 100 is an example of an "electro-optical device".

The element substrate 10 includes a display region E in which pixels 20R in each of which an organic EL element 30R that is to emit red (R) light is arranged, pixels 20G in each of which an organic EL element 30G that is to emit green (G) light is arranged, and pixels 20B in each of which an organic EL element 30B that is to emit blue (B) light is arranged are arranged in a matrix.

Note that the display region E is an example of a "first region".

In the following description, the pixel 20R, the pixel 20G, and the pixel 20B may be treated as a pixel 20 when the pixel 20R, the pixel 20G, and the pixel 20B are not distinguished, and the organic EL element 30R, the organic EL element 30G, and the organic EL element 30B may be treated as an organic EL element 30 when the organic EL element 30R, the organic EL element 30G, and the organic EL element 30B are not distinguished.

A color filter layer 50 is provided in the display region E. A red color filter layer 50R of the color filter layer 50 is arranged on the organic EL elements 30R of the pixels 20R, a green color filter layer 50G thereof is arranged on the organic EL elements 30G of the pixels 20G, and a blue color filter layer 50B thereof is arranged on the organic EL elements 30B of the pixels 20B.

Light that is emitted from each of the organic EL elements 30 passes through the color filter layer 50 of the element substrate 10, and is emitted as display light from the protection substrate 40 side. That is, the organic EL device 100 has a top emission structure.

Since the organic EL device 100 has the top emission structure, an opaque substrate can be used as the base material of the element substrate 10. In the present embodiment, the constituent material of a substrate body 8 (refer to FIGS. 5 and 7) that is the base material of the element substrate 10 is silicon.

A plurality of terminals 103 for external connection are arranged along one side on a long-side side of the element substrate 10 outside the display region E. A data line drive circuit 101 is provided between the plurality of terminals 103 for external connection and the display region E. Scan line drive circuits 102 are provided between two sides on a short-side side of the element substrate 10 and the display region E. That is, the scan line drive circuits 102 are provided adjacent to the display region E on the left and right sides thereof. The data line drive circuit 101 is provided in a data line drive circuit region 101a, and the scan line drive circuits 102 are provided in scan line drive circuit regions 102a.

Hereinafter, the data line drive circuit region 101a and the scan line drive circuit region 102a are collectively referred to as a drive circuit region 105. Note that the drive circuit region 105 (data line drive circuit region 101a, scan line drive circuit regions 102a) is an example of a "second region".

Hereinafter, the region other than the display region E and the drive circuit region 105 is referred to as a peripheral region 106. The peripheral region 106 is provided so as to surround the display region E. The peripheral region 106 is provided so as to surround the drive circuit region 105 (data line drive circuit region 101a, scan line drive circuit regions 102a). Note that the peripheral region 106 is an example of a "third region".

Hereinafter, the direction along the long side of the element substrate 10 is referred to as an X direction, the direction along the short side of the element substrate 10 is referred to as a Y direction, and the direction from the element substrate 10 toward the protection substrate 40 is referred to as a Z direction. Furthermore, a tip side of each arrow that indicates a direction in the drawings indicates a plus direction (+) and a base end side thereof indicates a minus direction (−). Also, viewing in the Z direction is referred to as plan view.

As described above, the organic EL device 100 (element substrate 10) includes the display region E in which the pixels 20 (pixel circuits 110 (refer to FIG. 2)) are arranged, the drive circuit region (data line drive circuit region 101a, scan line drive circuit regions 102a) in which the data line drive circuit 101 and the scan line drive circuits 102 are arranged, and the peripheral region 106.

The terminals 103 for external connection are connected to a circuit module (illustration is omitted). The circuit module to which the terminals 103 for external connection are connected functions as a power supply circuit and a control circuit for the organic EL device 100, and supplies a data signal, a control signal, and the like, in addition to supplying various voltages to the pixels 20, the data line drive circuit 101, and the scan line drive circuits 102.

The protection substrate 40 is smaller than the element substrate 10, and is arranged so as to oppose to the element substrate 10 such that the terminals 103 for external connection are exposed. The protection substrate 40 is a light-transmitting substrate, and a quartz substrate, a glass substrate, or the like can be used as the material thereof. The protection substrate 40 has a role of protecting the organic EL elements 30 arranged in the display region E from being damaged, and is provided so as to be wider than the display region E.

In the element substrate 10, as shown in FIG. 2, m rows of scan lines 12 are provided so as to extend along the X direction, and n columns of data lines 14 are provided so as to extend in the Y direction. Also, power supply lines 19 extending along the Y direction are provided for respective columns along the data lines 14 in the element substrate 10.

The pixel circuits 110 are provided in the element substrate 10 so as to be associated with intersection portions of the m rows of scan lines 12 and the n columns of data lines 14. Each pixel circuit 110 is a portion of the pixel 20. That is, the pixel circuits 110 of m rows by n columns are arranged in a matrix in the display region E.

A reset voltage Vorst for initialization is supplied (electricity is supplied) to the power supply lines 19. Furthermore, three control lines for supplying control signals Gcmp, Gel, and Gorst are provided in parallel to the scan lines 12, illustration thereof being omitted.

The scan lines 12 are electrically connected to the scan line drive circuits 102. The data lines 14 are electrically connected to the data line drive circuit 101. A control signal Ctr1 for controlling the scan line drive circuits 102 is supplied to the scan line drive circuits 102. A control signal Ctr2 for controlling the data line drive circuit 101 is supplied to the data line drive circuit 101.

The scan line drive circuits 102 generate scan signals Gwr(1), Gwr(2), Gwr(3), . . . , Gwr(m−1), and Gwr(m) for scanning the scan lines 12 column by column in a period of a frame in accordance with the control signal Ctr1. Furthermore, the scan line drive circuits 102 supply the control signals Gcmp, Gel, and Gorst to the control lines in addition to the scan signal Gwr. Note that the period of a frame is a period during which one shot image (frame) is displayed in the organic EL device 100. If the frequency of a vertical synchronization signal included in a synchronization signal is 120 Hz, for example, the period of one frame is approximately 8.3 msec.

The two scan line drive circuits 102 drive each of the m rows of scan lines 12 from two sides. If the delay of the scan signals is not an issue, one scan line drive circuit 102 may be provided on one side.

The data line drive circuit 101 supplies data signals Vd(1), Vd(2), . . . , Vd(n) respectively to the pixel circuits 110 that are located on a row selected by the scan line drive circuits 102 via the first, second, . . . , nth column data lines 14, the voltages of the data signals respectively corresponding to the tone data of the pixel circuits 110.

The element substrate 10 includes a substrate 7 (refer to FIGS. 5 to 7), and the pixel circuits 110, the scan line drive circuits 102, the data line drive circuit 101, and the like are mainly formed in the common substrate 7. The scan signals Gwr(1) to Gwr(m) that are output from the scan line drive circuits 102 are each a logic signal that is defined by H or L level. Therefore, the scan line drive circuit 102 is a group of CMOS (Complementary Metal Oxide Semiconductor) logic circuits that function in accordance with the control signal Ctr1. Also, in the scan signals Gwr(1) to Gwr(m), the H level corresponds to a voltage Vel on a high potential side of a power supply and the L level corresponds to a voltage Vct on a low potential side of the power supply.

Also, although the data signals Vd(1) to Vd(n) that are output from the data line drive circuit 101 are analog signals, the data line drive circuit 101 is configured such that the data signals Vd supplied from the circuit module are supplied to the first to nth column data lines 14 sequentially in accordance with the control signal Ctr1. Therefore, the data line drive circuit 101 also includes a CMOS logic circuit.

On the other hand, each pixel circuit 110 includes P-channel type transistors 121, 122, 123, 124, and 125 (refer to FIG. 3), which will be described later.

The pixel circuit 110 includes the transistors 121, 122, 123, 124, and 125, the organic EL element 30, and a capacitor 21, as shown in FIG. 3. The aforementioned scan signal Gwr, the control signals Gcmp, Gel, Gorst, and the like are supplied to the pixel circuit 110.

The transistors 121, 122, 123, 124, and 125 are P-channel type transistors.

Each organic EL element 30 (refer also to FIG. 5) has a structure in which a light-emitting functional layer 32 is interposed between a pixel electrode 31 and an opposing electrode 33 that oppose to each other. That is the organic EL element 30 has a structure in which the light-emitting functional layer 32 and the opposing electrode 33 are stacked sequentially on the pixel electrode 31.

The pixel electrode 31 is an anode for supplying holes to the light-emitting functional layer 32, and is constituted by a light-transmitting conductive material such as ITO (Indium Tin Oxide) film. The pixel electrode 31 is electrically connected to a drain of the transistor 124 and one of a source and a drain of the transistor 125.

The opposing electrode 33 is a cathode for supplying electrons to the light-emitting functional layer 32, and is formed by a conductive material that is light transmissive and has light-reflectivity such as an alloy of magnesium (Mg) and silver (Ag). The opposing electrode 33 is a common electrode that is provided over a plurality of pixels 20, and is electrically connected to a power supply line 18. The voltage Vct that is the voltage on a low potential side of the power supply in the pixel circuit 110 is supplied to the power supply line 18.

The light-emitting functional layer 32 includes layers such as a hole injection layer, a hole transport layer, an organic light emitting layer, and an electron transport layer that are stacked sequentially from the pixel electrode 31 side. In the organic EL element 30, the light-emitting functional layer 32 emits light through holes supplied from the pixel electrode 31 and electrons supplied from the opposing electrode 33 being combined.

Also, power supply lines 6 are provided in the element substrate 10 so as to intersect the power supply lines 19 and extend in the X direction. Note that the power supply lines 19 may be provided so as to extend in the Y direction, or may be provided so as to extend both in the X direction and in the Y direction. A source of the transistor 121 is electrically connected to the power supply line 6, a drain thereof is electrically connected to one of a source and a drain of the transistor 123 and a source of the transistor 124. Also, the voltage Vel that is the voltage on a high potential side of the power supply in the pixel circuit 110 is supplied to the power supply line 6. Also, one end of the capacitor 21 is electrically connected to the power supply line 6. The transistor 121 functions as a drive transistor that causes a current corresponding to the voltage between the gate and the source of the transistor 121 to flow.

A gate of the transistor 122 is electrically connected to the scan line 12, and one of a source and a drain thereof is electrically connected to the data line 14. Also, the other of the source and the drain of the transistor 122 is electrically connected to the gate of the transistor 121, another end of the capacitor 21, and another of the source and the drain of the transistor 123. The transistor 122 is electrically connected between the gate of the transistor 121 and the data line 14, and functions as a write transistor that controls the electrical connection between the gate of the transistor 121 and the data line 14.

A gate of the transistor 123 is electrically connected to one of the control lines and is supplied with the control signal Gcmp. The transistor 123 functions as a threshold compensation transistor that controls electrical connection between the gate and drain of the transistor 121.

A gate of the transistor 124 is electrically connected to one of the control lines and is supplied with the control signal Gel. The drain of the transistor 124 is electrically connected to one of a source and a drain of the transistor 125 and the pixel electrode 31 of the organic EL element 30. The transistor 124 functions as a light emission control transistor that controls the electrical connection between the drain of the transistor 121 and the pixel electrode 31 of the organic EL element 30.

Note that the pixel electrode 31 of the organic EL element 30 is electrically connected to the drain of the transistor 124 and one of the source and the drain of the transistor 125 via a relay electrode 28.

A gate of the transistor 125 is electrically connected to one of the control lines and is supplied with the control signal Gorst. Also, the other of the source and the drain of the transistor 125 is electrically connected to the power supply line 19 and is supplied with the reset voltage Vorst. The transistor 125 functions as an initialization transistor that controls the electrical connection between the power supply line 19 and the pixel electrode 31 of the organic EL element 30.

General Configuration of Pixels

Figure 4:
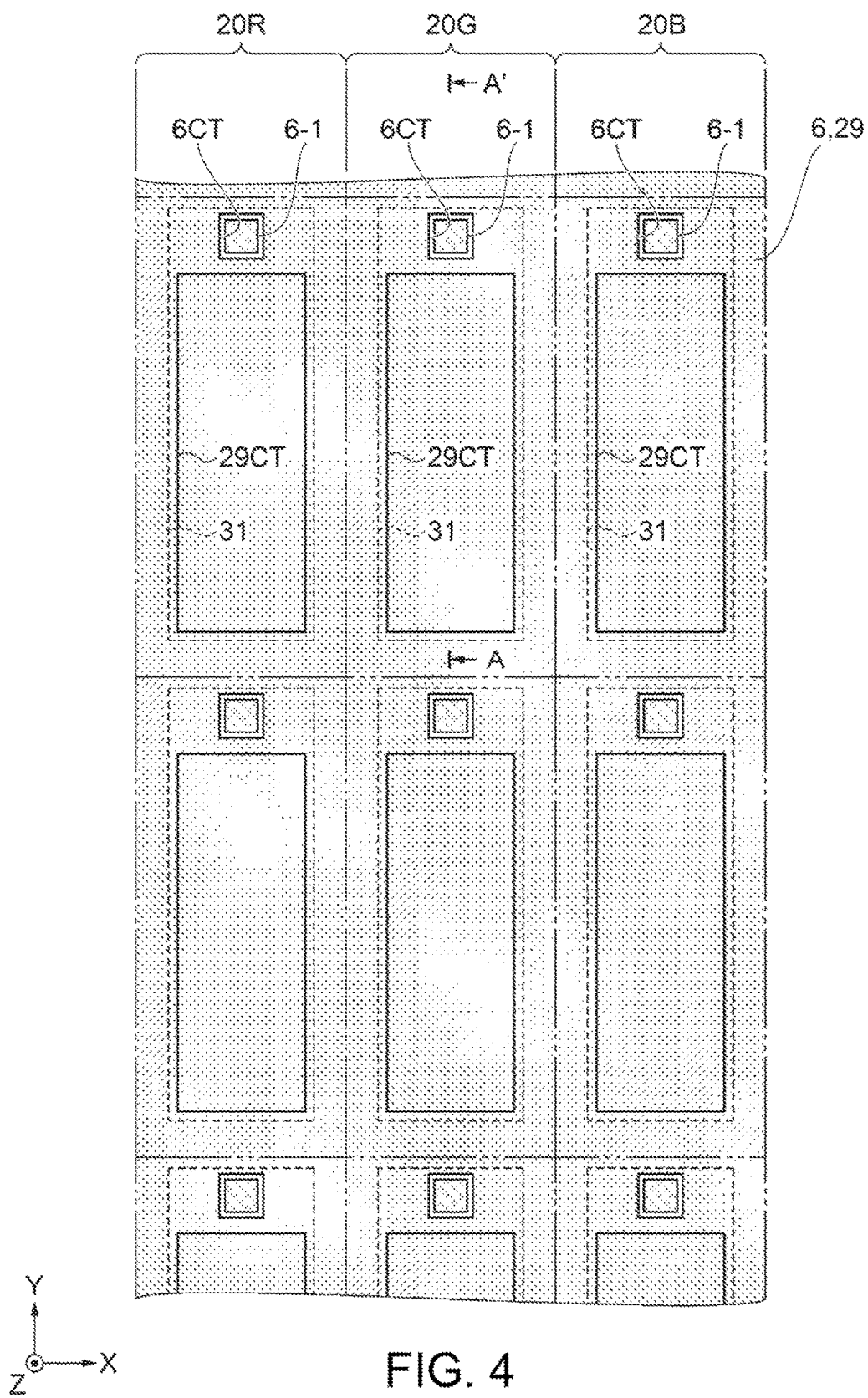
FIG. 4 is a schematic planar view illustrating a general configuration of pixels.

FIG. 4 is a schematic planar view illustrating a general configuration of the pixels. In the drawing, the power supply line 6, a relay electrode 6-1, the pixel electrode 31, and an insulating film 29, among the constituent elements of each pixel 20 are illustrated, and illustration of other constituent elements is omitted. Also, dashed-two dotted lines in the drawing show outlines of the pixels 20. Hereinafter, the general configuration of the pixels 20 will be described with reference to FIG. 4.

Figure 5:
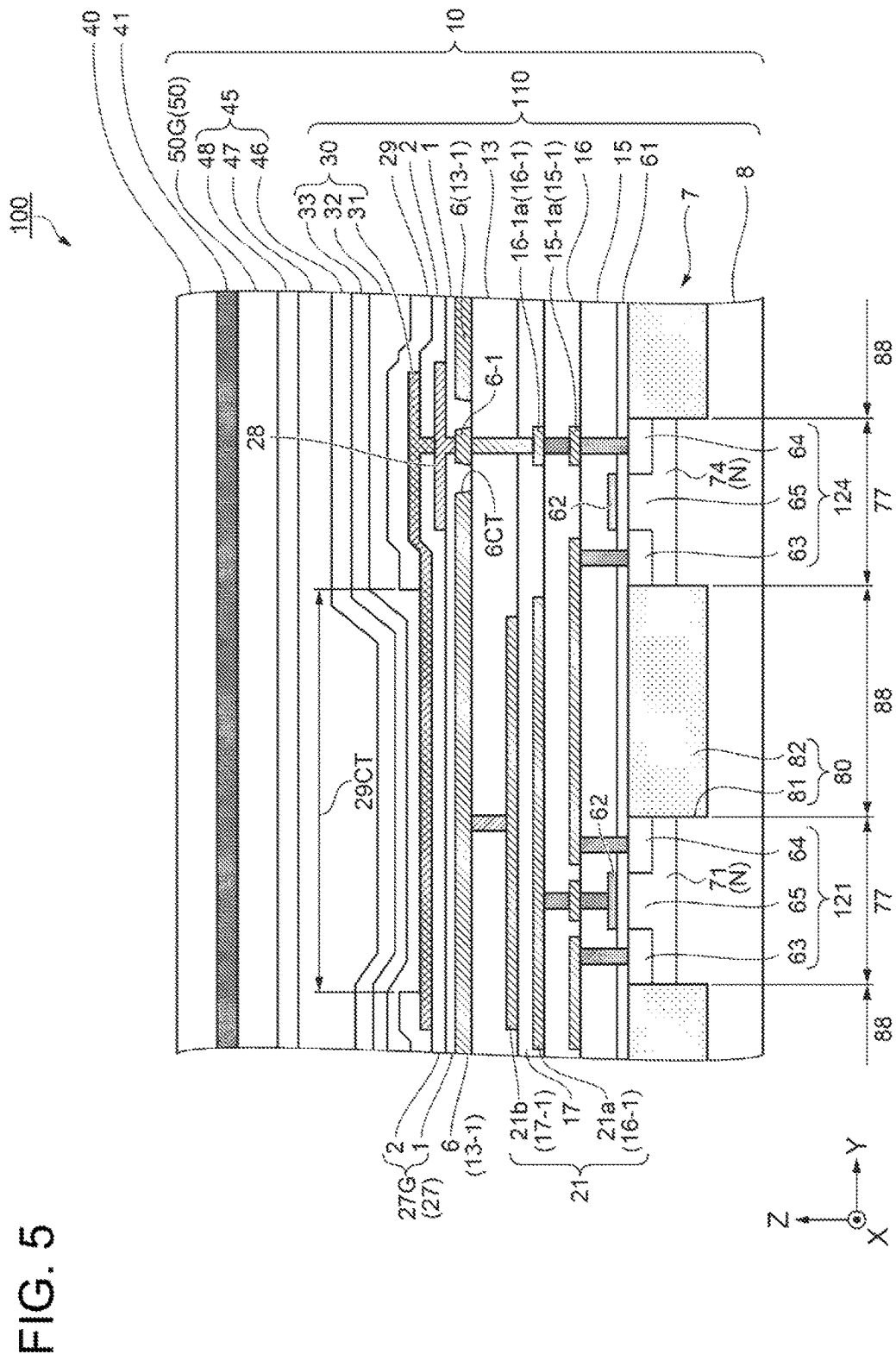
FIG. 5 is a schematic cross-sectional view of the organic EL device taken along line A-A' in FIG. 4.

The pixels 20R, 20G, and 20B each have a rectangular shape in plan view, as shown in FIG. 4, and each are arranged such that a longitudinal direction thereof is in the Y direction. The pixels 20 each include a power supply line 6, the relay electrode 6-1, the pixel electrode 31, and the insulating film 29. Note that the positional relationship of the power supply line 6, the pixel electrode 31, and the insulating film 29 in the Z direction is as shown in FIG. 5, which will be described later. Note that, in FIG. 4, solid lines and broken lines are used for facilitating understanding, and do not relate to the actual positional relationship in a vertical direction.

The power supply line 6 is provided on a substantially entire surface of the display region E, and an opening 6CT is provided for each pixel 20. The relay electrode 6-1, which is formed in the same step as the power supply line 6, is provided inside the opening 6CT. The power supply line 6 is constituted by a conductive material having light-reflectivity, and functions as a light reflecting film.

The pixel electrode 31 has a rectangular shape elongated in the Y direction, and is provided for each of the pixels 20R, 20G, and 20B.

The insulating film 29 is constituted by an insulating film that is light-transmissive, and is provided so as to cover a peripheral edge portion of the pixel electrode 31. That is, the insulating film 29 includes an opening 29CT that exposes a portion of the pixel electrode 31. The opening 29CT also has a rectangular shape elongated in the Y direction, similarly to the pixel electrode 31.

A portion of the pixel electrode 31 that is not covered by the insulating film 29, that is, a portion of the pixel electrode 31 exposed by the opening 29CT is in contact with the light-emitting functional layer 32, supplies current to the light-emitting functional layer 32, and causes the light-emitting functional layer 32 to emit light. Accordingly, the opening 29CT provided in the insulating film 29 is a light emitting region of the pixel 20.

Cross Section Structure of Organic EL Device

FIG. 5 is a schematic cross-sectional view of the organic EL device taken along line A-A' in FIG. 4.

The transistors 121 and 124 of the pixel circuit 110 are illustrated in FIG. 5, and illustration of the transistors 122, 123, and 125 are omitted. The transistors 122, 123, and 125 have the same configuration as the transistors 121 and 124.

Also, the transistors that constitute the above-described data line drive circuit 101 and the scan line drive circuit 102 are formed in the same step as the transistors 121, 122, 123, 124, and 125.

Hereinafter, the cross-sectional structure of the organic EL device 100 will be described with reference to FIG. 5.

The organic EL device 100 includes the element substrate 10, the protection substrate 40, the resin layer (adhesive) 41 that is interposed between the element substrate 10 and the protection substrate 40, and the like, as shown in FIG. 5.

The resin layer 41 has the role of bonding the element substrate 10 and the protection substrate 40, and an epoxy resin, an acrylic resin, or the like can be used, for example.

The element substrate 10 is constituted by the substrate 7, the pixel circuit 110, a sealing layer 45, and the color filter layer 50 that are arranged sequentially on the substrate 7 including the inside of the substrate 7.

The substrate 7 includes a substrate body 8 made of silicon, for example. The substrate 7 includes element regions 77 and element isolation regions 88. One of the transistors 121, 122, 123, 124, and 125 are formed in the element regions 77.

A pair of ion implantation portions 63 and 64 is provided in the element region 77 of the substrate 7. One of the ion implantation portions 63 and 64 is a source, and the other is a drain. A portion interposed between the ion implantation portions 63 and 64 is a channel 65. Transistors 121, 122, 123, 124, and 125 are each formed by the ion implantation portions 63 and 64, the channel 65, and a gate insulating film 61 and a gate 62, which are described later.

The region between the element region 77 of the transistor 121 and the element region 77 of the transistor 124 is the element isolation region 88. A trench 81 that is formed by etching the substrate 7 (substrate body 8) in the −Z direction is formed in the element isolation region 88. A silicon oxide 82 fills the inside of the trench 81. A later-described element isolation portion 80 is constituted by the trench 81 and the silicon oxide 82.

As described above, the substrate 7 includes an STI structure in which an element region 77 and an element region 77 are isolated by the trench 81 that is filled with the silicon oxide 82. That is, each element region 77 is surrounded by the trench 81 (element isolation portion 80) that is filled with the silicon oxide 82, and a transistor provided in an element region 77 does not electrically interfere with another transistor provided in another element region 77.

The gate insulating film 61 is provided so as to cover a surface of the substrate 7. The gate insulating film 61 functions as the gate insulating film of each of the transistors 121 and 124. The gates 62 made of a conductive film such as polysilicon are provided on the gate insulating film 61, for example. The gates 62 are respectively provided so as to oppose the channels 65 of the transistors 121 and 124. That is, portions of the substrate 7, in the element regions 77, that oppose the gates 62 with the gate insulating film 61 being interposed therebetween are channels 65.

A first interlayer insulating film 15 is formed so as to cover the gate 62. The first interlayer insulating film 15 is provided with contact holes that respectively extend to the gate, the source, and the drain of the transistor 121, and contact holes that respectively extend to the source and the drain of the transistor 124, for example. The contact holes are each filled with a conductive material.

A first interconnect layer 15-1 is formed on the first interlayer insulating film 15. A relay electrode electrically connected to the gate of the transistor 121, relay electrodes respectively electrically connected to the source and the drain of the transistor 121, a relay electrode electrically connected to the source of the transistor 124, a relay electrode 15-1a electrically connected to the drain of the transistor 124, and the like are formed with the first interconnect layer 15-1. Also, the drain of the transistor 121 and the source of the transistor 124 are electrically connected by a relay electrode formed with the first interconnect layer 15-1.

A second interlayer insulating film 16 is formed so as to cover the first interconnect layer 15-1. The second interlayer insulating film 16 is provided with a contact hole that extends to a relay electrode that is electrically connected to the gate of the transistor 121 and a contact hole that extends to the relay electrode 15-1a. These contact holes are each filled with a conductive material.

A second interconnect layer 16-1 is formed on the second interlayer insulating film 16. One electrode 21a of the capacitor 21 and a relay electrode 16-1a are formed with the second interconnect layer 16-1. The one electrode 21a of the capacitor 21 is electrically connected to the gate of the transistor 121 via the conductive material that fills a contact hole of the second interlayer insulating film 16 and a relay electrode formed on the first interlayer insulating film 15. The relay electrode 16-1a is electrically connected to the relay electrode 15-1a via the conductive material that fills a contact hole in the second interlayer insulating film 16.

An insulating film 17 is formed so as to cover the second interconnect layer 16-1. The insulating film 17 is a capacitor insulating film for forming the capacitor 21.

A third interconnect layer 17-1 is formed on the insulating film 17. The other electrode 21b of the capacitor 21 is formed with the third interconnect layer 17-1. As a result, the capacitor 21 is formed by the one electrode 21a, the insulating film 17, and the other electrode 21b.

A third interlayer insulating film 13 is formed so as to cover the third interconnect layer 17-1. The third interlayer insulating film 13 is made of silicon oxide that has been subjected to planarization processing by CMP (Chemical Mechanical Polishing). A contact hole that extends to the other electrode 21b of the capacitor 21 is formed in the third interlayer insulating film 13. A contact hole that extends to the relay electrode 16-1a is formed in the third interlayer insulating film 13 and the insulating film 17. These contact holes are each filled with a conductive material.

A fourth interconnect layer 13-1 is formed on the third interlayer insulating film 13. The fourth interconnect layer 13-1 is formed by a conductive material having light-reflectivity such as aluminum. The power supply line 6 and a relay electrode 6-1 are formed with the fourth interconnect layer 13-1. The power supply line 6 includes the opening 6CT, and the relay electrode 6-1 is arranged inside the opening 6CT.

The power supply line 6 is electrically connected to the other electrode 21b of the capacitor 21 via the conductive material that fills a contact hole that passes through the third interlayer insulating film 13. Furthermore, the relay electrode 6-1 is electrically connected to the relay electrode 16-1a via the conductive material that fills a contact hole that passes through the third interlayer insulating film 13 and the insulating film 17.

A first insulating film 1 is formed so as to cover the fourth interconnect layer 13-1. The first insulating film 1 is made of silicon nitride, for example. The first insulating film 1 covers the power supply line 6 and the relay electrode 6-1, and is formed so as to extend over a substantially entire surface of the display region E. A contact hole that extends to the relay electrode 6-1 is formed in the first insulating film 1.

A relay electrode 28 is formed on the first insulating film 1. The relay electrode 28 is made of titanium nitride, for example, and is formed so as to be wider than the opening 6CT such that the opening 6CT is covered in plan view. The material of the relay electrode 28 fills the inside of a contact hole that passes through the first insulating film 1 so that the relay electrode 28 is electrically connected to the relay electrode 6-1.

A second insulating film 2 is formed so as to cover the relay electrode 28 and the first insulating film 1. The second insulating film 2 is made of silicon oxide, for example, and is formed so as to extend over a substantially entire surface of the display region E. A contact hole that extends to the relay electrode 28 is formed in the second insulating film 2.

The pixel electrode 31 is formed on the second insulating film 2. The material of the pixel electrode 31 fills the inside of a contact hole that passes through the second insulating film 2 so that the pixel electrode 31 is electrically connected to the relay electrode 28. That is, the pixel electrode 31 is electrically connected to the drain of the transistor 124 via the relay electrode 28, the relay electrode 6-1, the relay electrode 16-1a, the relay electrode 15-1a, and the like.

The insulating film 29 is formed so as to cover the pixel electrode 31. The insulating film 29 includes the opening 29CT that exposes a portion of the pixel electrode 31. As described above, the opening 29CT is a light emitting region of the pixel 20.

In the light emitting region (opening 29CT), the first insulating film 1 and the second insulating film 2 are laminated in the +Z direction in the stated order between the power supply line 6 and the pixel electrode 31. Note that an optical distance adjustment layer 27G in the pixel 20G is formed by the first insulating film 1 and the second insulating film 2.

An optical distance adjustment layer 27B, illustration thereof being omitted, in the pixel 20B that is to emit blue (B) light is constituted by the first insulating film 1. An optical distance adjustment layer 27R of the pixel 20R that is to emit red (R) light is constituted by the first insulating film 1, the second insulating film 2, and the third insulating film (illustration is omitted). Accordingly, the thickness of the optical distance adjustment layers 27 increase in the order of the optical distance adjustment layer 27B of the pixel 20B, the optical distance adjustment layer 27G of the pixel 20G, and the optical distance adjustment layer 27R of the pixel 20R.

The organic EL element 30 is constituted by the pixel electrode 31, the light-emitting functional layer 32, and the opposing electrode 33 that are laminated in the +Z direction in the light emitting region (opening 29CT).

The configurations of the light-emitting functional layer 32 and the opposing electrode 33 are as described above. Note that the organic light emitting layer in the light-emitting functional layer 32 may be constituted by a single layer, or may be constituted by two or more layers (a blue light emitting layer that emits blue light and a yellow light emitting layer that emits light including red and green, for example).

The sealing layer 45 is arranged on the opposing electrode 33. The sealing layer 45 is a passivation film for suppressing deterioration of the light-emitting functional layer 32 and the opposing electrode 33 due to water, oxygen, or the like, and suppresses the intrusion of water and oxygen to the light-emitting functional layer 32 and the opposing electrode 33.

The sealing layer 45 is constituted by a first sealing layer 46, a planarization layer 47, and a second sealing layer 48 that are laminated in the stated order in the +Z direction from the opposing electrode 33 side, covers the organic EL element 30, and is provided on a substantially entire surface of the element substrate 10. Note that the sealing layer 45 is provided with openings (illustration is omitted) for exposing the terminals 103 for external connection (refer to FIG. 1).

The first sealing layer 46 and the second sealing layer 48 are made of, for example, silicon oxynitride obtained by a known plasma CVD (chemical vapor deposition) method or the like, and have high barrier properties against water and oxygen.

The planarization layer 47 is made of a material having excellent thermal stability, such as an epoxy-based resin or a coat-type inorganic material (silicon oxide, or the like). The planarization layer 47 covers defects (pinholes or cracks) in the first sealing layer 46 or, foreign substances thereon, and the like, thereby forming a flat surface.

The color filter layer 50 is arranged on the sealing layer 45. In FIG. 5, a green color filter layer 50G corresponding to the pixel 20G is arranged. Note that a blue color filter layer 50B is arranged in the pixel 20B, and a red color filter layer 50R is arranged in the pixel 20R.

General Configuration of Substrate

Here, the substrate will be further described.

Figure 6:
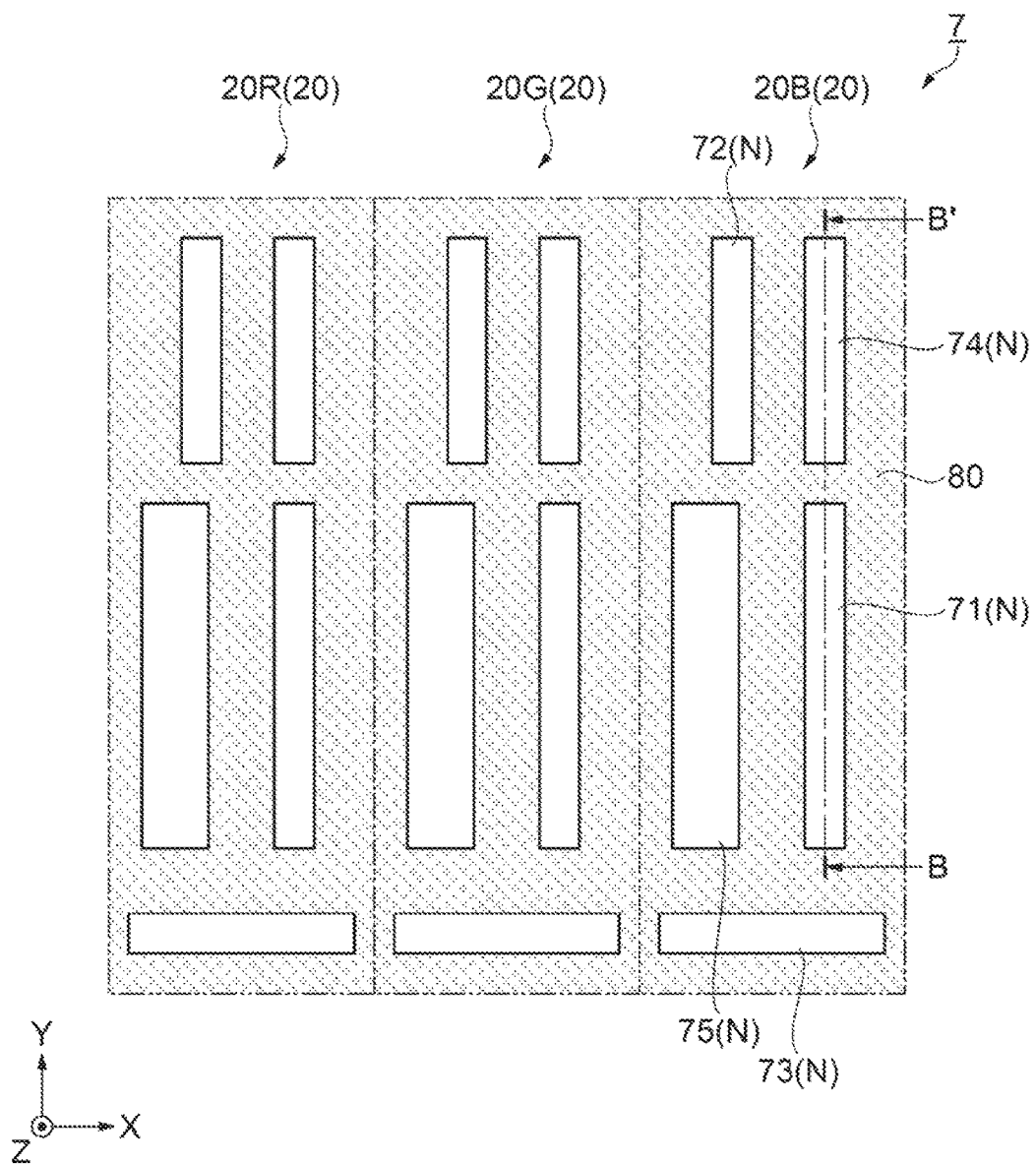
FIG. 6 is a schematic planar view illustrating a state of a substrate in the pixels.
Figure 7:
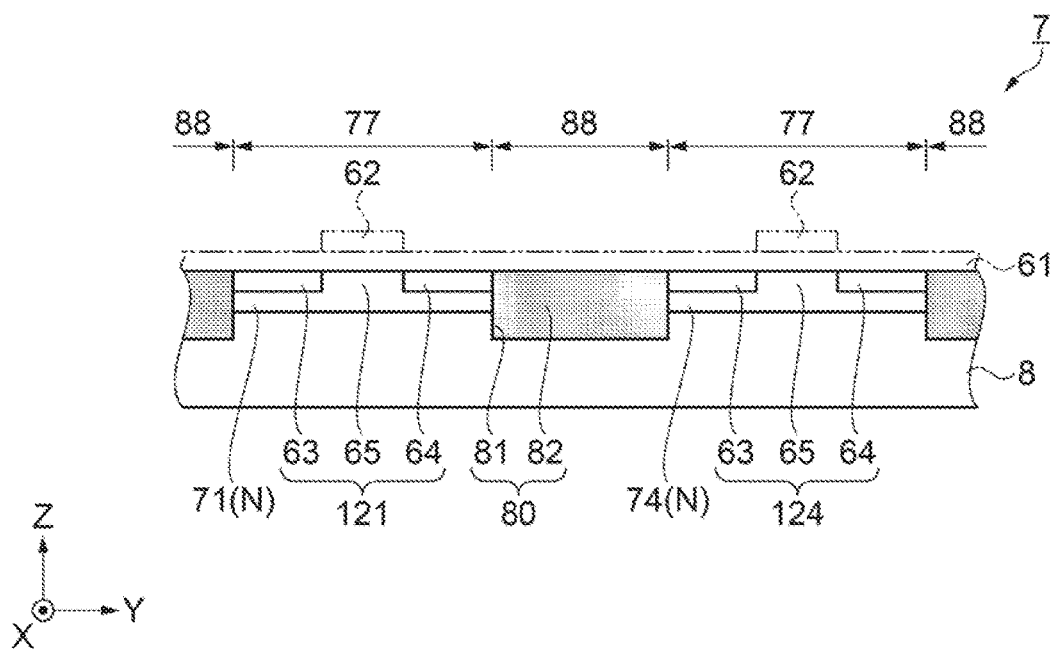
FIG. 7 is a schematic cross-sectional view of the substrate taken along line B-B' in FIG. 6.
Figure 8:
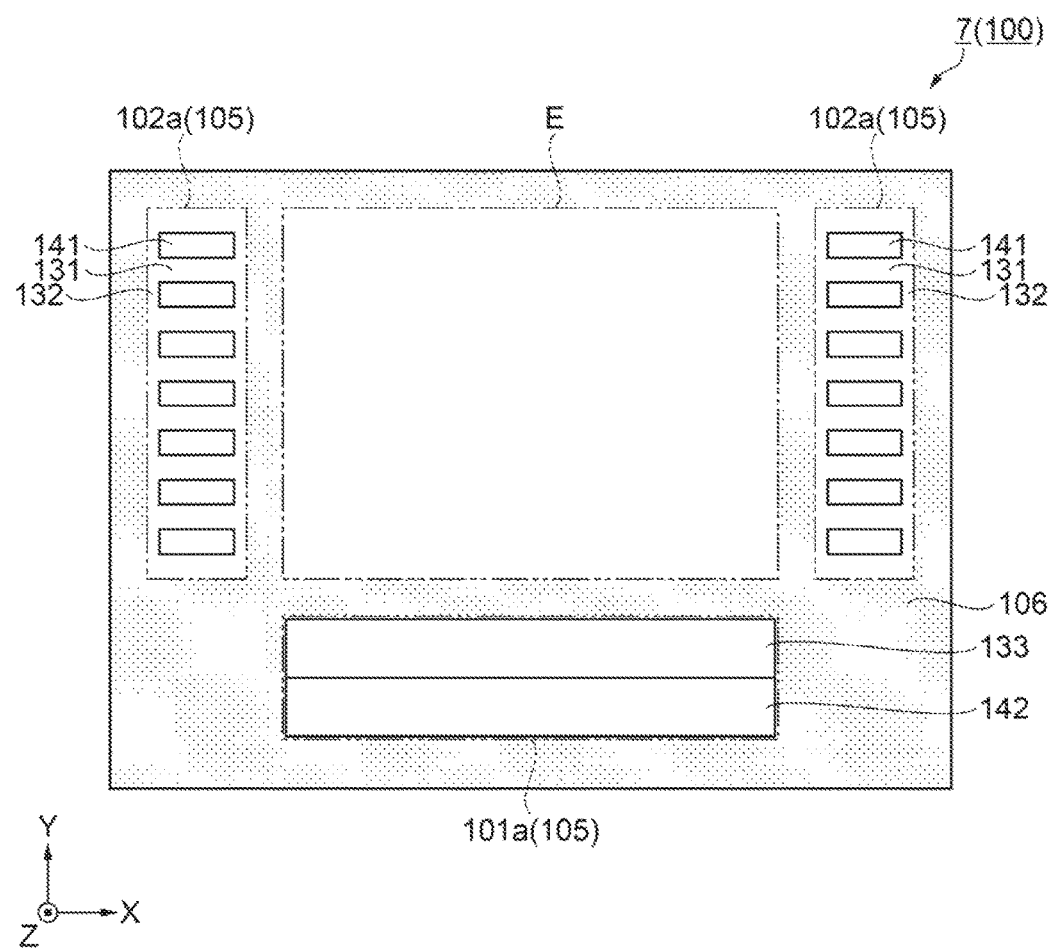
FIG. 8 is a schematic planar view illustrating a state of the substrate in the organic EL device.

FIG. 6 is a schematic planar view illustrating a state of the substrate in the pixels. FIG. 7 is a schematic cross-sectional view of the substrate taken along line B-B' in FIG. 6. FIG. 8 is a schematic planar view illustrating a state of the substrate in the organic EL device.

Note that, in FIG. 6, boundaries (outlines) of the pixels 20 are designated by dashed-two dotted lines. In FIG. 7, the gate insulating film 61 and the gates 62 are designated by dashed-two dotted lines. In FIG. 8, a region surrounded by dashed-two dotted lines is the display region E or the drive circuit region 105, and a shaded region is the peripheral region 106.

Hereinafter, the general configuration of the substrate 7 will be described in detail with reference to FIGS. 6 to 8.

In each pixel 20, the substrate 7 includes n-wells 71, 72, 73, 74, and 75 (n-type semiconductor regions) formed by ion-implanting n-type impurities (such as phosphorus) into the substrate body 8 (refer to FIG. 7), as shown in FIG. 6. The n-wells 71, 72, 74, and 75 each have a rectangular shape that is long in the Y direction in plan view. The n-well 73 has a rectangular shape that is long in the X direction. The element isolation portion 80 is arranged in regions between two of the n-well 71, the n-well 72, the n-well 73, the n-well 74, and the n-well 75. In other words, the n-well 71, the n-well 72, the n-well 73, the n-well 74, and the n-well 75 are each surrounded by the element isolation portion 80, and are isolated by the element isolation portion 80, and electrical interference therebetween is suppressed.

In the following description, the n-wells 71, 72, 73, 74, and 75 that are formed in the pixel 20 may be referred to as pixel wells N.

The substrate 7 includes the substrate body 8, the pixel wells N (n-wells 71, 72, 73, 74, and 75), and the element isolation portion 80, as shown in FIG. 7.

The substrate body 8 is a p-type silicon substrate (p-type semiconductor substrate). The pixel wells N are formed by ion-implanting n-type impurities into the substrate body 8. The element isolation portion 80 is configured by the trench 81 that is formed by etching the substrate body 8 in the −Z direction and the silicon oxide 82 that fills the inside of the trench 81. The substrate 7 includes a surface that is planarized by planarization processing.

The trench 81 is an example of a "first trench". The silicon oxide 82 is an example of an "insulating layer".

Note that, in the case where the substrate body 8 is etched in a direction that intersects the −Z direction and the trench 81 includes a side wall having a tapered shape that intersects the −Z direction, the shape of the region, in plan view, in which the pixel well N is formed and the shape of the region in which the element isolation portion 80 is formed change in the direction that intersects the −Z direction. In the present embodiment, the region of the surface of the substrate 7 in which the pixel well N is formed is defined as the element region 77, and the region of the surface of the substrate 7 in which the element isolation portion 80 is formed is defined as the element isolation region 88. That is, in the drawings, the region of the surface of the substrate 7 in which the pixel well N is formed is the element region 77, and the region of the surface of the substrate 7 in which the element isolation portion 80 is formed is the element isolation region 88.

The element isolation region 88 is an example of a "first trench element isolation region".

Note that, the drive circuit region 105 and the peripheral region 106 include element isolation portions (illustration is omitted) that have the same configuration as the element isolation portion 80, detailed description thereof being given later.

The ratio of the area of the element isolation region 88 relative to the area of the display region E is D1. Since the element isolation region 88 is configured by the trench 81 and the silicon oxide 82 that fills the inside of the trench 81, as described above, the element isolation portion 80 and the trench 81 have the same shape (area) in plan view. Therefore, the ratio of the area of the region in which the trench 81 is provided relative to the area of the display region E is D1.

Hereinafter, the ratio of the area of the element isolation region 88 relative to the area of the display region E, and the ratio of the area of the region in which the trench 81 is provided relative to the area of the display region E will be referred to as a display region trench density. The display region trench density is D1.

Note that the trench density D1 of the display region E is an example of a "first density".

The n-well 71 includes the ion implantation portions 63 and 64 that are formed by ion-implanting p-type impurities (such as boron). The ion implantation portions 63 and 64 are formed by ion-implanting p-type impurities to the n-well 71 using the gate 62 as a mask, and are the source and the drain of the transistor 121. P-type impurities are not ion-implanted in a portion of the n-well 71 that opposes the gate 62 (a portion of the n-well 71 directly under the gate 62), and the portion will be the channel 65 of the transistor 121.

The transistor 121 is constituted by the ion implantation portions 63 and 64 (source and drain) in the n-well 71, the channel 65 in the n-well 71, the gate insulating film 61, and the gate 62 that is arranged so as to oppose the channel 65 in the n-well 71 with the gate insulating film 61 being interposed therebetween.

Similarly, the transistor 124 is constituted by the ion implantation portions 63 and 64 (source and drain) in the n-well 74, the channel 65 in the n-well 74, the gate insulating film 61, and the gate 62 that is arranged so as to oppose the channel 65 in the n-well 74 with the gate insulating film 61 being interposed therebetween.

The other transistors 122, 123, and 125 have the same configurations (structures) to those of the transistors 121 and 124.

The n-wells 71, 72, 73, 74, and 75 are each surrounded by the element isolation portion 80 and are isolated by the element isolation portion 80, as described above. As a result, mutual electrical interference is suppressed in the transistors 121, 122, 123, 124, and 125 by the element isolation portion 80. That is, the substrate 7 includes a STI structure in which the n-wells 71, 72, 73, 74, and 75 are isolated by the element isolation portion 80.

The substrate 7 (organic EL device 100) includes the display region E, the drive circuit region 105 (data line drive circuit region 101a, scan line drive circuit region 102a) and the peripheral region 106 (shaded region in the drawing), as shown in FIG. 8.

A plurality of band-shaped p-type semiconductor regions 141 that are long in the X direction are arranged in the Y direction in the scan line drive circuit region 102a. An n-well 131 is arranged between a p-type semiconductor region 141 and an adjacent p-type semiconductor region 141. An n-well 132 is arranged so as to surround a region in which the p-type semiconductor regions 141 and the n-wells 131 are arranged alternatingly.

Seven rows of the p-type semiconductor regions 141 are illustrated in the scan line drive circuit region 102a in FIG. 8. In the present embodiment an n-well 131 and a p-type semiconductor region 141 that are adjacent to each other correspond to one row, for example, and therefore m rows of the n-well 131 and the p-type semiconductor region 141 are arranged in the scan line drive circuit region 102a, m being the number of rows of the pixel circuit 110.

In the CMOS logic circuits that constitute the scan line drive circuit 102, P-channel type transistors are formed in the n-wells 131 and 132, and N-channel type transistors are formed in the p-type semiconductor regions 141.

An n-well 133 is arranged in an upper region, in the data line drive circuit region 101a, that is on a side opposing the display region E. A p-type semiconductor region 142 is arranged in a lower region, in the data line drive circuit region 101a, on a side opposite to the display region E.

In the CMOS logic circuits that constitute the data line drive circuit 101, P-channel type transistors are formed in the n-well 133 and N-channel type transistors are formed in the p-type semiconductor region 142.

The drive circuit region 105 includes a STI structure in which an element isolation portion (illustration is omitted) is provided, and electrical interference between transistors is suppressed by the element isolation portion provided in the drive circuit region 105. In this way, the drive circuit region 105 includes the element isolation portion that is configured similarly to the element isolation portion 80 in the display region E. Furthermore, the element isolation portion provided in the drive circuit region 105 includes a trench (illustration is omitted) provided in the drive circuit region 105 and a silicon oxide 82 (illustration is omitted) that fills the inside of the trench.

Hereinafter, the element isolation portion provided in the drive circuit region 105 is referred to as a drive circuit element isolation portion. Furthermore, the trench provided in the drive circuit region 105 is referred to as a drive circuit trench. Furthermore, the n-wells 131, 132, and 133 and the p-type semiconductor regions 141 and 142 that are arranged in the drive circuit region 105 are referred to as drive circuit wells.

The drive circuit trench is an example of a "second trench". Furthermore, the region in which the drive circuit element isolation portion is provided is an example of a "second trench element isolation region".

The ratio of the area in which the drive circuit element isolation portion is provided relative to the area of the drive circuit region 105 is D2. Since the drive circuit element isolation portion is configured by the drive circuit trench and the silicon oxide 82 that fills the inside of the drive circuit trench, as described above, the drive circuit element isolation portion and the drive circuit trench have the same shape (area) in plan view. Therefore, the ration of the area of the region in which the drive circuit trench is provided relative to the drive circuit region 105 is D2.

Hereinafter, the ratio of the region in which the drive circuit element isolation portion is provided relative to the area of the drive circuit region 105, and the ratio of the area of the region in which the drive circuit trench is provided relative to the area of the drive circuit region 105 are referred to as a drive circuit region trench density. The drive circuit region trench density is D2.

Note that the trench density D2 of the drive circuit region is an example of a "second density".

The peripheral region 106 includes an element isolation portion (illustration is omitted) that is the same as the element isolation portion 80 in the display region E. That is, the element isolation portion provided in the peripheral region 106 has the same shape as that of the element isolation portion 80 in the display region E, and includes a trench (illustration is omitted) provided in the peripheral region 106 and a silicon oxide 82 (illustration is omitted) that fills the inside of the trench. Furthermore, the trench provided in the peripheral region 106 has the same shape as that of the trench 81 in the display region E. That is, the region in which the element isolation portion 80 is provided (element isolation region 88) in the display region E and the region in which the element isolation portion is provided in the peripheral region 106 have the same pattern in plan view. The region in which the trench 81 is provided in the display region E and the region in which the trench is provided in the peripheral region 106 have the same pattern in plan view.

Hereinafter, the element isolation portion provided in the peripheral region 106 is referred to as a peripheral element isolation portion, and the trench provided in the peripheral region 106 is referred to as a peripheral trench.

The region in which the peripheral element isolation portion is provided is an example of a "third trench element isolation region". The peripheral trench is an example of a "third trench".

The ratio of the area of the region in which the peripheral element isolation portion is provided relative to the area of the peripheral region 106 is D3. Since the peripheral element isolation portion and the peripheral trench have the same shape (area) in plan view, the ratio of the area of the region in which the peripheral trench is provided relative to the area of the peripheral region 106 is D3.

Hereinafter, the ratio of the area of the region in which the peripheral element isolation portion is provided relative to the area of the peripheral region 106, and the ratio of the area of the region in which the peripheral trench is provided relative to the area of the peripheral region 106 will be referred to as a trench density in the peripheral region. The trench density in the peripheral region is D3.

Note that the peripheral region trench density D3 is an example of a "third density".

Furthermore, the element isolation region 88 of the display region E and the region in which the element isolation portion of the peripheral region 106 is provided have the same pattern in plan view, and the region in which the trench 81 of the display region E is provided and the region in which the trench of the peripheral region 106 is provided have the same pattern in plan view, and therefore the trench density D1 in the display region is equal to the peripheral region trench density D3.

Transistors are arranged more sparsely in the display region E in which the pixel circuits 110 are arranged than in the drive circuit region 105 in which the data line drive circuit 101 or the scan line drive circuit 102 is provided. That is, the ratio of the area of the region in which the pixel wells N (transistors) are provided relative to the area of the display region E is smaller than the ratio of the area of the region in which the drive circuit wells (transistors) are provided relative to the drive circuit region 105. Therefore, the display region trench density D1 is larger than the drive circuit region trench density D2.

Accordingly, the present embodiment has a configuration in which the display region trench density D1 is equal to the peripheral region trench density D3, and the display region trench density D1 and the peripheral region trench density D3 are smaller than the drive circuit region trench density D2. In other words, the present embodiment has a configuration in which the display region trench density D1 is equal to the peripheral region trench density D3, and the display region trench density D1 differs from the drive circuit region trench density D2.

Manufacturing Method of Organic EL Device

Figure 9:
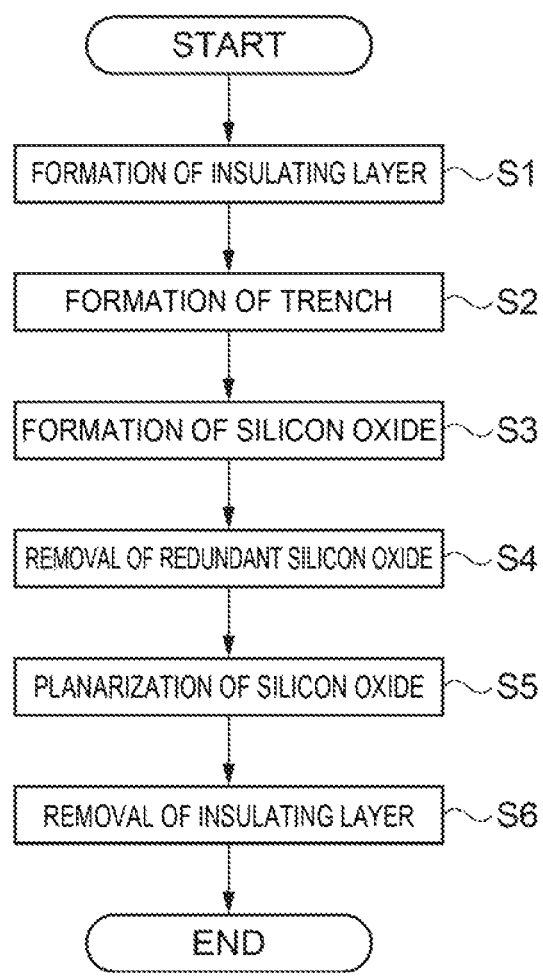
FIG. 9 is a process flow illustrating a manufacturing method of the organic EL device according to Embodiment 1.

FIG. 9 is a process flow illustrating a manufacturing method of the organic EL device according to the present embodiment. FIGS. 10A-10E, which are drawings corresponding to FIG. 7, is a schematic cross-sectional view illustrating a state of the substrate after having been subjected to main steps in the process flow shown in FIG. 9.

Figure 10:
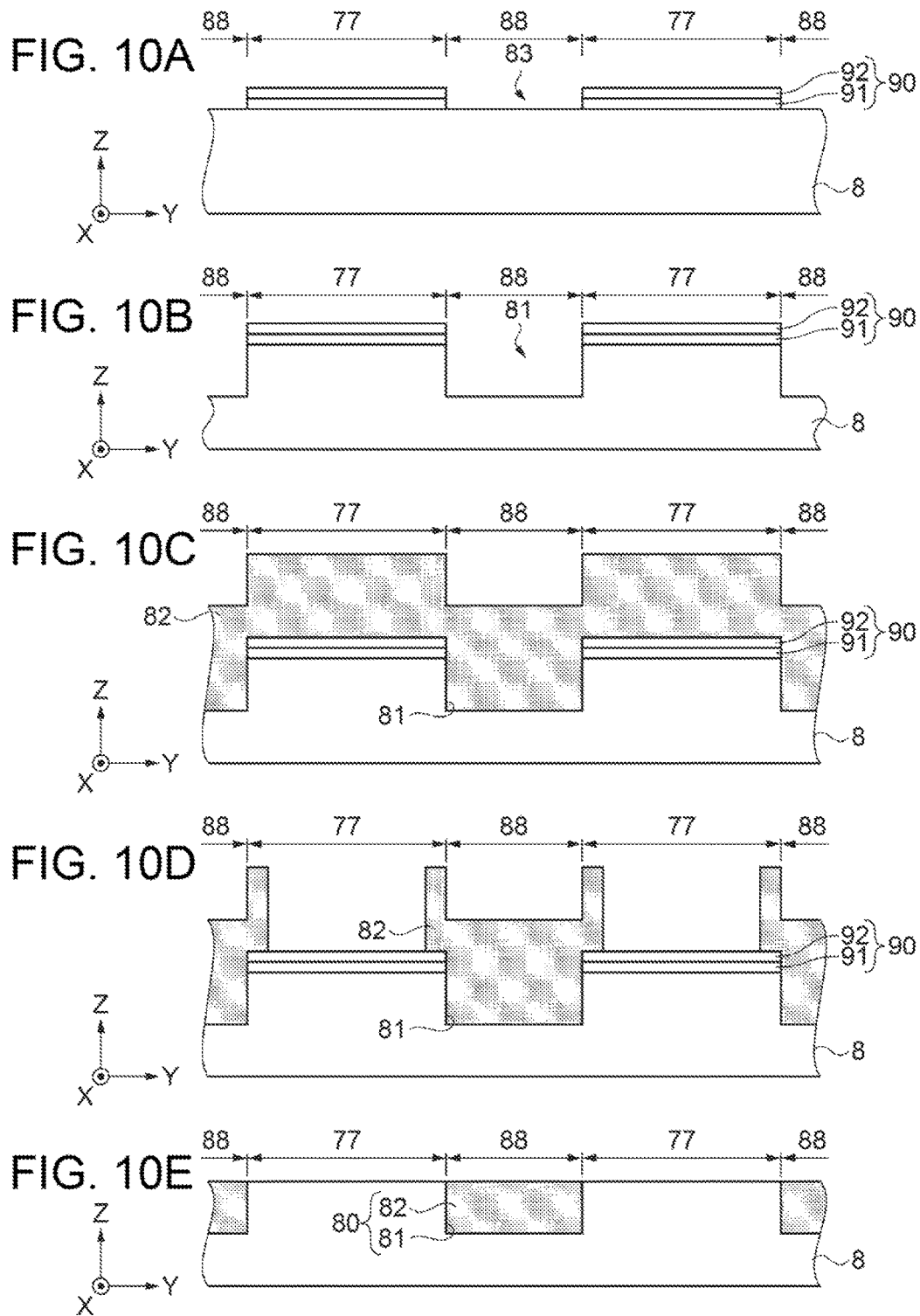
FIG. 10A is a schematic cross-sectional view illustrating a state of the substrate after being subjected to one of main steps in the process flow shown in FIG. 9.
FIG. 10B is a schematic cross-sectional view illustrating a state of the substrate after being subjected to one of main steps in the process flow shown in FIG. 9.
FIG. 10C is a schematic cross-sectional view illustrating a state of the substrate after being subjected to one of main steps in the process flow shown in FIG. 9.
FIG. 10D is a schematic cross-sectional view illustrating a state of the substrate after being subjected to one of main steps in the process flow shown in FIG. 9.
FIG. 10E is a schematic cross-sectional view illustrating a state of the substrate after being subjected to one of main steps in the process flow shown in FIG. 9.

Hereinafter, the manufacturing method of the organic EL device 100 according to the present embodiment will be described with reference to FIGS. 9 and 10.

The manufacturing method of the organic EL device according to the present embodiment includes, as shown in FIG. 9, a step of forming an insulating layer 90 (step S1), a step of forming the trench 81 (step S2), a step of forming the silicon oxide 82 (step S3), a step of removing unnecessary silicon oxide 82 (step S4), a step of performing planarization processing on the silicon oxide 82 (step S5), and a step of removing the insulating layer 90 (step S6).

Note that step S1 is an example of "forming a polishing stopper layer". Step S2 is an example of "forming a trench". Step S3 is an example of "forming an insulating layer". Step S5 is an example of "polishing the insulating layer".

In step S1, a first insulating film 91 made of silicon oxide and a second insulating film 92 made of silicon nitride are sequentially deposited on the substrate body 8 using a plasma CVD method, and the insulating layer 90 constituted by the first insulating film 91 and the second insulating film 92 is formed, as shown in FIG. 10A. Subsequently, an opening 83 is formed in the element isolation region 88 in the insulating layer 90 using a dry etching method in which a fluorine-containing gas is the reactant gas. That is, the opening 83 having the same shape as the element isolation region 88 in plan view is formed in the insulating layer 90.

The insulating layer 90 is an example of a "polishing stopper layer". The opening 83 is an example of a "predetermined pattern".

In step S2, anisotropic etching in the −Z direction is performed on the substrate body 8 using a dry etching method in which a fluorine-containing gas is the reactant gas, for example, the insulating layer 90 being used as a mask, and thereby the trench 81 is formed in the element isolation region 88 of the substrate body 8, as shown in FIG. 10B. That is, the trench 81 having the same shape as the element isolation region 88 in plan view is formed in the substrate body 8 in the display region E.

Specifically, in step S2, the trench 81 having the display region trench density D1 is formed in the substrate body 8 in the display region E, the drive circuit trench having the drive circuit region trench density D2 is formed in the substrate body 8 in the drive circuit region 105, and the peripheral trench having the peripheral region trench density D3 is formed in the substrate body 8 in the peripheral region 106 such that the display region trench density D1 differs from the drive circuit region trench density D2, and the display region trench density D1 is equal to the peripheral region trench density D3.

Furthermore, in step S2, the peripheral trench in the peripheral region 106 is formed so as to surround the trench 81 in the display region E. The peripheral trench in the peripheral region 106 is formed so as to surround the drive circuit trench in the drive circuit region 105. Furthermore, the trench 81 in the display region E and the peripheral trench in the peripheral region 106 are formed so as to have the same pattern. That is, the trench 81 in the display region E and the peripheral trench in the peripheral region 106 are formed such that the display region trench density D1 is equal to the peripheral region trench density D3.

In step S3, the silicon oxide 82 is formed so as to cover the inside of the trench 81 and the surface of the insulating layer 90 using a plasma CVD method, for example, as shown in FIG. 10C. The silicon oxide 82 is formed so as to fill the trench 81 and extend in the +Z direction from the trench 81.

In step S4, redundant silicon oxide 82 in the element regions 77 is removed by etching using a dry etching method in which the fluorine-containing gas is the reactant gas, for example, such that the silicon oxide 82 is arranged mainly in the element isolation region 88, as shown in FIG. 10D.

In step S5, planarization processing by CMP is performed, and portions of the silicon oxide 82 that extend in the +Z direction from the trench 81 is removed by polishing, and a flat surface is formed.

Note that the second insulating film 92 (silicon nitride) is harder than the silicon oxide 82, and is unlikely to be polished by CMP. That is, the second insulating film 92 (silicon nitride) is hardly polished by CMP, and has the role of a polishing stopper.

The planarization processing by CMP includes physical processing, namely mechanical polishing, and the polishing speed differs depending on the area of a polishing target. That is, the polishing speed is slower in a portion in which the occupied area of a polishing target per unit area (hereinafter referred to as an area of a polishing target) is larger than in a portion in which the area of the polishing target is small.

Therefore, in order for the polishing target to be uniformly polished in step S5, the redundant silicon oxide 82 in the element regions 77 is removed in step S4 described above, and the silicon oxide 82 is mainly arranged in the element isolation region 88 such that the areas of the polishing targets (silicon oxide 82) in the display region E are to be uniform.

In step S6, the insulating layer 90 is removed by etching using a dry etching method in which a fluorine-containing gas is the reactant gas, for example, and the element isolation portion 80 having a configuration in which the silicon oxide 82 fills the inside of the trench 81 is formed in the element isolation region 88 (display region E), as shown in FIG. 10E. That is, the element isolation portion 80 having the display region trench density D1 is formed in the display region E.

Furthermore, the drive circuit element isolation portion having a configuration in which the drive circuit trench is filled with the silicon oxide 82 is formed in the drive circuit region 105. That is, the drive circuit element isolation portion having the drive circuit region trench density D2 is formed in the drive circuit region 105.

Furthermore, the peripheral element isolation portion having a configuration in which the peripheral trench is filled with the silicon oxide 82 is formed in the peripheral region 106. That is, the peripheral element isolation portion having the peripheral region trench density D3 is formed in the peripheral region 106.

Effect Achieved by Present Embodiment

Figure 11:
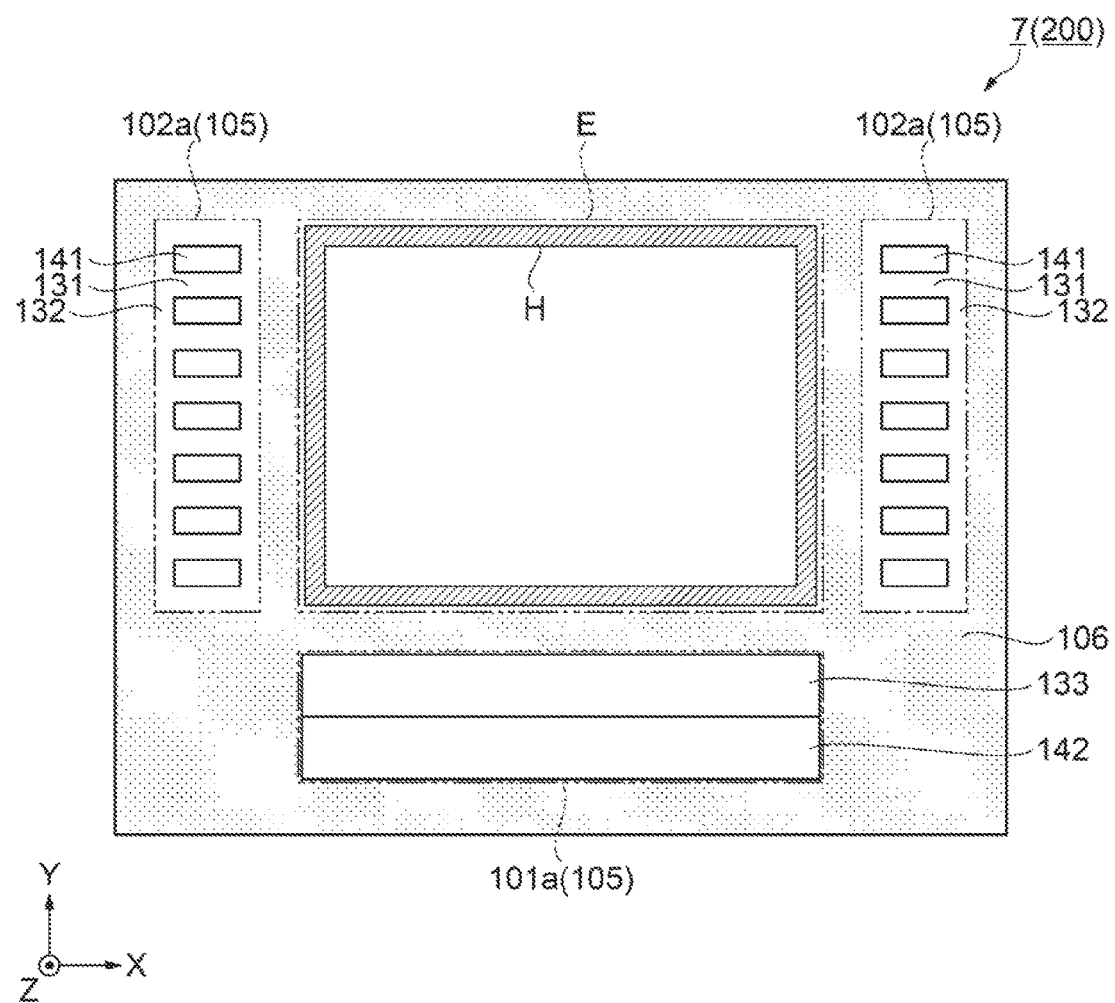
FIG. 11 is a schematic planar view illustrating a state of a substrate of an organic EL device according to a comparative example.
Figure 12A:
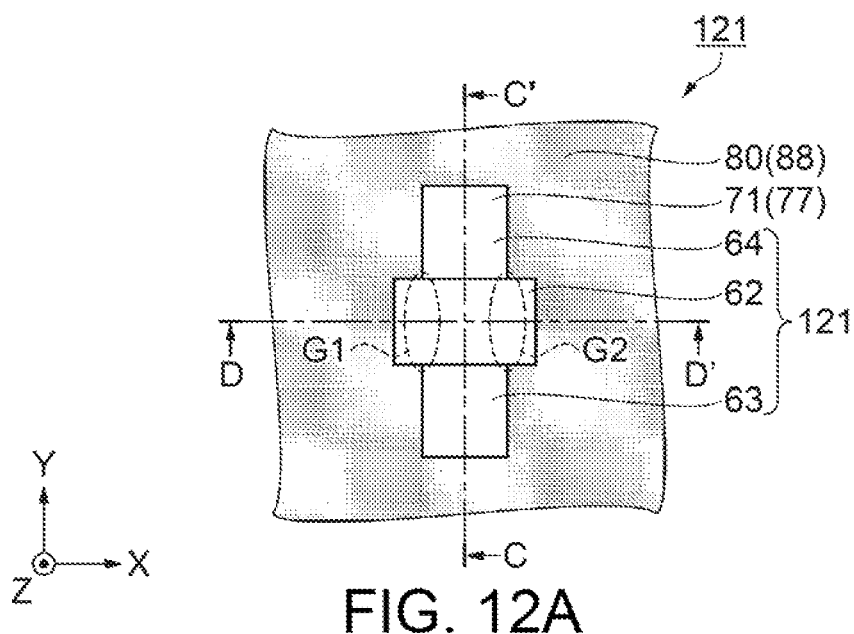
FIG. 12A is a schematic planar view of a transistor of the organic EL device according to the comparative example.
Figure 12B:
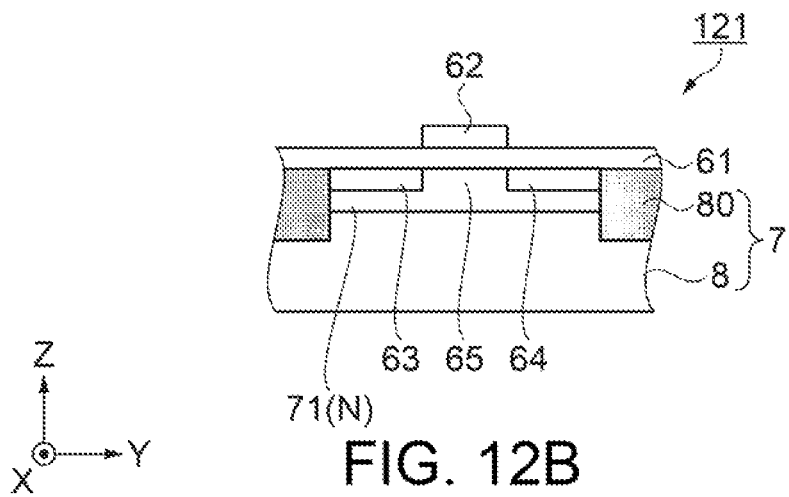
FIG. 12B is a schematic cross-sectional view of the transistor taken along line C-C' in FIG. 12A.
Figure 12C:
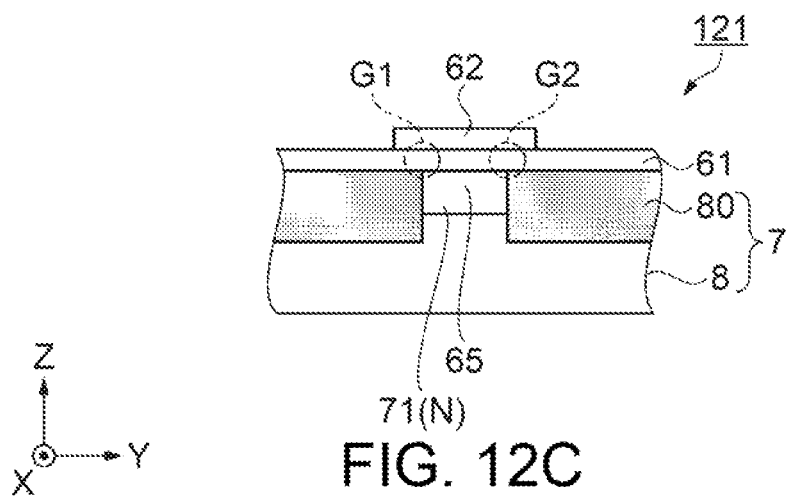
FIG. 12C is a schematic cross-sectional view of the transistor taken along line D-D' in FIG. 12A.

FIG. 11 is a drawing corresponding to FIG. 8, and is a schematic planar view illustrating a state of a substrate of an organic EL device according to a comparative example. FIG. 12A is a schematic planar view of a transistor of the organic EL device according to the comparative example. FIG. 12B is a schematic cross-sectional view of the transistor taken along line C-C' in FIG. 12A. FIG. 12C is a schematic cross-sectional view of the transistor taken along line D-D' in FIG. 12A.

In FIGS. 11 and 12A to 12C, the same reference numerals are given for constituent parts that are the same as those in the present embodiment. In FIGS. 12A to 12C, states of constituent elements of a transistor 121 are schematically illustrated, and illustration of other constituent elements are omitted.

Hereinafter, the effects achieved by the organic EL device 100 according to the present embodiment will be described by comparing an organic EL device 200 according to the comparative example and the organic EL device 100 according to the present embodiment.

In the organic EL device 200 of the comparative example, the peripheral region trench density D3 is equal to the drive circuit region trench density D2, and is smaller than the display region trench density D1. That is, the occupied area of a polishing target per unit area in the display region E is smaller than the occupied area of a polishing target per unit area in the drive circuit region 105 and the occupied area of a polishing target per unit area in the peripheral region 106.

The comparative example differs from the present embodiment in this regard.

As described above, the planarization processing by CMP in step S5 includes physical processing, namely mechanical polishing, and the polishing speed differs depending on the area of a polishing target. Therefore, the redundant silicon oxide 82 in the element regions 77 is removed in step S4 such that the occupied area of the polishing target (silicon oxide 82) is made uniform.

However, even if the redundant silicon oxide 82 in the element regions 77 is removed in step S4, the occupied area of the silicon oxide 82 per unit area in the display region E is smaller than the occupied area of the silicon oxide 82 per unit area in the drive circuit region 105 and the occupied area of the silicon oxide 82 per unit area in the peripheral region 106, and therefore the polishing speed of the silicon oxide 82 in the display region E becomes faster than the polishing speed of the silicon oxide 82 in the drive circuit region 105 and the polishing speed of the silicon oxide 82 in the peripheral region 106. That is, in the planarization processing (polishing processing) in step S5, polishing progresses fast in the display region E, and polishing progresses slowly in the drive circuit region 105 and the peripheral region 106.

Furthermore, the polishing speed of the polishing target in the display region E becomes slow in the display region E on a side closer to the peripheral region 106 due to the influence of the peripheral region 106. Therefore, the polishing surface of the portion of the display region E on the side closer to the peripheral region 106 protrudes in the +Z direction compared with the polishing surface of a portion of the display region E on a side further from the peripheral region 106. That is, the flatness of the polishing surface of the portion of the display region E on the side closer to the peripheral region 106 degrades, and the shape of the polishing surface changes so as to protrude in the +Z direction.

Specifically, in a region H that is hatched by oblique lines in FIG. 11, the flatness of the polishing surface of the display region E degrades, and the shape of the polishing surface changes so as to protrude in the +Z direction.

Note that, in the case where the display region trench density D1 is smaller than the peripheral region trench density D3, polishing progresses slowly in the display region E, and polishing progresses fast in the peripheral region 106. The polishing surface of the display region E on the side closer to the peripheral region 106 is recessed in the −Z direction compared with the polishing surface of the display region E on the side further form the peripheral region 106. That is, the flatness of the polishing surface of the display region E on the side closer to the peripheral region 106 degrades, and the shape of the polishing surface changes so as to be recessed in the −Z direction.

The element isolation portion 80 is arranged so as to surround the n-well 71, as shown in FIG. 12. In the transistor 121, p-type impurities are ion-implanted using the gate 62 as a mask, and the ion implantation portions 63 and 64 are formed in the n-well 71. The ion implantation portions 63 and 64 in the n-well 71 are respectively to be a source and a drain of the transistor 121, and a portion (channel 65) in which p-type impurities are not ion-implanted in the n-well 71 is to be a channel of the transistor 121. The gate 62 of the transistor 121 is arranged so as to oppose the channel 65 in the n-well 71 with the gate insulating film 61 being interposed therebetween.

In the transistor 121, when a negative voltage relative to the voltage of the source is applied to the gate 62, an inversion region (p-type semiconductor region) is generated in the channel 65 (n-type semiconductor) that is arranged so as to oppose the gate 62 in the n-well 71, and holes (current) can flow from the source to the drain. When a voltage that is more negative is applied to the gate 62, the inversion region increases in volume and more current can flow. That is, the current flowing in the transistor 121 changes depending on the voltage (electrical field intensity) applied to the channel 65 in the n-well 71 from the gate 62.

When the shape of the polishing surface in the display region E changes on the side thereof closer to the peripheral region 106, the film thickness of the gate insulating film 61 changes in regions G1 and G2 that are each surrounded by a broken line in FIGS. 12A and 12C. Specifically, when the shape of the polishing surface in the display region E changes, the gate insulating film 61 becomes thinner in the regions G1 and G2 than in a region other than the regions G1 and G2. Therefore, in the regions G1 and G2, the voltage (electrical field intensity) applied to the channel 65 in the n-well 71 from the gate 62 changes from that in a region other than the regions G1 and G2, and the characteristic of the transistor 121 changes. As a result, the characteristic of the transistor 121 in the display region E on the side closer to the peripheral region 106 (region H in FIG. 11) differs from that in the display region on the side farther from the peripheral region 106 (region other than region H in FIG. 11).

Furthermore, in the other transistors 122, 123, 124, and 125 as well, change in characteristic occurs similarly to the transistor 121. Accordingly, the characteristics of the other transistors 122, 123, 124, and 125 in the display region E on the side closer to the peripheral region 106 (region H in FIG. 11) differ from those in the display region E on the side farther from the peripheral region 106 (region other than region H in FIG. 11).

The organic EL element 30 emits light when a current is supplied via the transistors 121, 122, 123, 124, and 125. If the characteristics of the transistors 121, 122, 123, 124, and 125 in the display region E on the side closer to the peripheral region 106 differ from those in the display region E on the side farther from the peripheral region 106, the luminance of light emitted from the organic EL element 30 changes. That is, a minute difference (change) in luminance of light that is to be emitted from the organic EL elements 30 occurs because of the difference in characteristics of the transistors 121, 122, 123, 124, and 125 between the organic EL elements 30 in the display region E on the side closer to the peripheral region 106 and those in the display region E on the side farther from the peripheral region 106.

The human eye is sensitive to a difference (change) in luminance of light, and can distinguish a minute difference (change) in luminance of light. Therefore, a minute difference (change) in luminance of light that is emitted from the organic EL elements 30 is likely to be observed as luminance unevenness (display unevenness).

Accordingly, there is a problem in the organic EL device 200 according to the comparative example in that luminance unevenness (display unevenness) is likely to occur in the region H that is hatched by oblique lines in FIG. 11.

In the organic EL device 100 according to the present embodiment, the display region trench density D1 is equal to the peripheral region trench density D3, and therefore the occupied area of the silicon oxide 82 per unit area in the display region E is equal to the occupied area of the silicon oxide 82 per unit area in the peripheral region 106, and the polishing speed of the silicon oxide 82 in the display region E is substantially equal to the polishing speed of the silicon oxide 82 in the peripheral region 106. Accordingly, the occurrence of a problem is suppressed in which the shape of the polishing surface in the display region E changes in the display region E on the side closer to the peripheral region 106 and is different from that in the display region E on the side farther from the peripheral region 106.

Accordingly, in the organic EL device 100 according to the present embodiment, the difference (change) in luminance of light that is emitted from the organic EL element 30 decreases between in the display region E on the side closer to the peripheral region 106 and in the display region E on the side farther from the peripheral region 106, and therefore the luminance unevenness (display unevenness) in the region H that occurs in the organic EL device 200 according to the comparative example can be suppressed. Therefore, the organic EL device 100 according to the present embodiment has a higher display uniformity than the organic EL device 200 according to the comparative example, and can provide high quality display.

Embodiment 2

Figure 13:
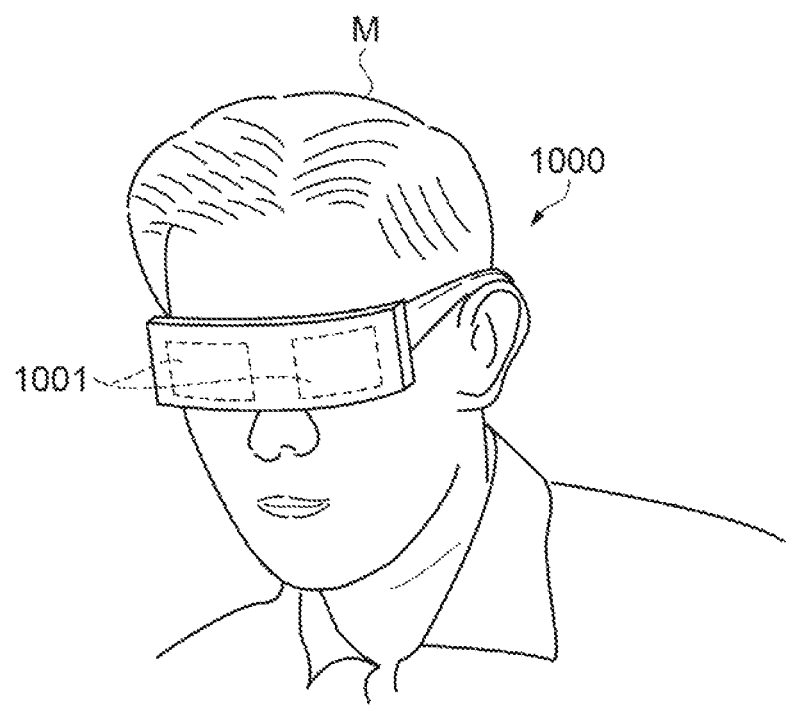
FIG. 13 is a schematic diagram illustrating a configuration of a head mounted display according to Embodiment 2.

FIG. 13 is a schematic diagram illustrating a configuration of a head mounted display according to Embodiment 2.

The head mounted display 1000 is an example of an "electronic apparatus", and includes two display portions 1001 provided so as to correspond to the left and right eyes, as shown in FIG. 13. A viewer M who wears the head mounted display 1000 on the head like glasses can view characters, images, and the like displayed on the display portions 1001. For example, if an image provided in consideration of parallax is displayed on the left and right display portions 1001, three-dimensional video can be enjoyed.

The aforementioned organic EL device 100 is used in the display portions 1001. The display uniformity is improved in the organic EL device 100, and high quality display can be provided. Accordingly, the head mounted display 1000 having high display quality can be provided by mounting the organic EL devices 100 in the display portions 1001.

The invention is not limited to the forgoing embodiments, and appropriate changes can be made without departing from the gist or the idea of the invention that can be read from the claims or the entire specification. Electra-optical devices with such a change and electronic apparatuses in which those electro-optical devices are mounted are also included in the technical scope of the invention.

Various modifications other than the foregoing embodiments are conceivable. Hereinafter, modifications will be described.

Modification 1

The electro-optical device to which the invention is applied is not limited to the organic EL device 100 including the aforementioned organic EL element 30 serving as a light emitting element, and the invention can be largely applied to electro-optical devices including a self light emitting type light emitting element such as an inorganic EL element or an LED, for example.

Modification 2

The electro-optical device to which the invention is applied is not limited to the aforementioned organic EL device 100, and may be a liquid crystal device, or a display element (digital mirror device) in which micro mirrors are arrayed.

Modification 3

The electronic apparatus to which the invention is applied is not limited to the aforementioned head mounted display 1000, and an electro-optical device to which the invention has been applied may be mounted to a head up display, an electronic view finder of a digital camera, or a display portion of a mobile information terminal, navigator, or the like, for example.

The entire disclosure of Japanese Patent Application No. 2015-093914, filed May 1, 2015 and No. 2016-017713, filed Feb. 2, 2016 are expressly incorporated by reference herein.

What is claimed is:

1. An electro-optical device comprising:
    a first region that includes a first trench element isolation region and a pixel circuit including a transistor, the pixel circuit being isolated by the first trench element isolation region, the first trench element isolation region having a first trench density defined as a ratio of an area of the first trench element isolation region relative to an area of the first region;
    a second region that includes a second trench element isolation region and a drive circuit that supplies a signal for driving the pixel circuit, the drive circuit being isolated by the second trench element isolation region, the second trench element isolation region having a second trench density defined as a ratio of an area of the second trench element isolation region relative to an area of the second region; and
    a third region that includes a third trench element isolation region and is arranged at least between the first region and the second region, the third trench element isolation region having a third trench density defined as a ratio of an area of the third trench element isolation region relative to an area of the third region,
    wherein the first trench density is different from the second trench density, and the first trench density is equal to the third trench density.

2. The electro-optical device according to claim 1, wherein the third region surrounds the first region.

3. An electronic apparatus comprising the electro-optical device according to claim 2.

4. The electro-optical device according to claim 1, wherein the third region surrounds the second region.

5. An electronic apparatus comprising the electro-optical device according to claim 4.

6. An electronic apparatus comprising the electro-optical device according to claim 1.

* * * * *